(12) United States Patent
Makhlouf

(10) Patent No.: US 6,292,172 B1
(45) Date of Patent: Sep. 18, 2001

(54) SYSTEM AND METHOD FOR CONTROLLING AND INTEGRATING VARIOUS MEDIA DEVICES IN A UNIVERSALLY CONTROLLED SYSTEM

(76) Inventor: Samir B. Makhlouf, 723 Creek Trail, Kennesaw, GA (US) 30144

( * ) Notice: Subject to any disclaimer, the term of this patent is extended or adjusted under 35 U.S.C. 154(b) by 0 days.

(21) Appl. No.: 09/045,839

(22) Filed: Mar. 20, 1998

(51) Int. Cl.[7] ............... G09G 5/08; G09G 5/00; H04N 11/00
(52) U.S. Cl. ............... 345/157; 345/184; 348/552
(58) Field of Search ............... 345/156, 157, 345/158, 160, 161, 163, 168, 169, 145, 184; 340/825.29; 348/114, 552

(56) References Cited

U.S. PATENT DOCUMENTS

| | | | |
|---|---|---|---|
| 4,670,743 | * 6/1987 | Zemke | 345/157 |
| 5,086,296 | * 2/1992 | Clark | 345/157 |
| 5,293,158 | * 3/1994 | Soma | 345/161 |
| 5,488,392 | * 1/1996 | Harris | 345/157 |
| 5,760,764 | * 6/1998 | Martinelli | 345/160 |
| 5,821,921 | * 10/1998 | Osborn et al. | 345/184 |
| 5,903,259 | * 5/1999 | Brusky et al. | 345/168 |
| 5,956,016 | * 9/1999 | Kuenzner et al. | 345/156 |
| 5,990,869 | * 11/1999 | Kubica et al. | 345/157 |

* cited by examiner

*Primary Examiner*—Steven Saras
*Assistant Examiner*—Paul A. Bell
(74) *Attorney, Agent, or Firm*—Morris, Manning & Manning, LLP

(57) ABSTRACT

A pointer control device includes a housing and a keypad mounted on the housing. A movable guide member extends over the keypad. The movable guide member is operable for being moved over different locations of the keypad. The movable guide member causes a direction control signal to be generated to control a display screen pointer. A pointer control mechanism is positioned along on the movable guide member. The pointer control mechanism is movable along the movable guide member and movement of the pointer control mechanism provides a direction control for the display screen pointer. The housing unit may be a remote control unit with a set of function keys operable to select one of a plurality of modes of operation of a computer system. The function keys may be operable to select a television mode, network communication mode or a video cassette recorder mode. The keypad over which the pointer control mechanism move may be a typewriter style keypad on the remote control. Alternatively, the keypad be part of a computer keyboard.

14 Claims, 25 Drawing Sheets

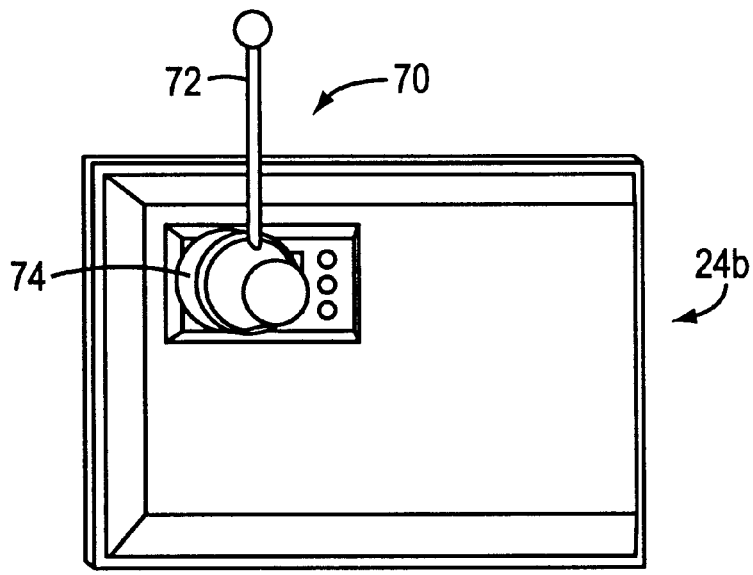
FIG. 4A
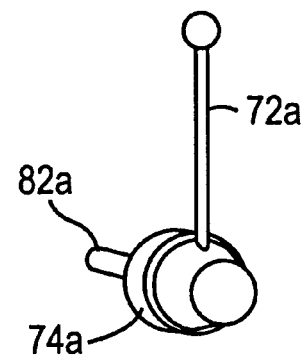
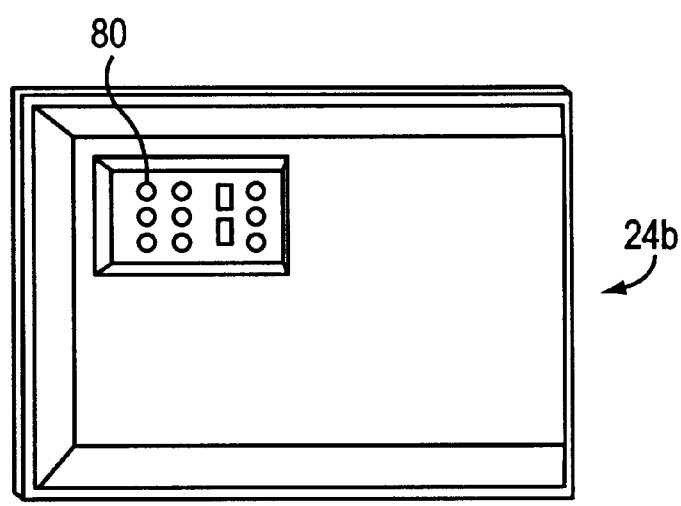
FIG. 4B

|  | INTERNET ADDRESS |
|---|---|
| C | www.Company1.com |
| B | www.business1.com |
| U | www.College1.com |
| Y | www.yahoo.com |
| = |  |
| = |  |
| = |  |
| S | www.sam.com |

FIG. 8A

| NUMERIC ASSIGNMENT | INTERNET ADDRESS |
|---|---|
| 1 | www.Company1.com |
| 2 | www.Company2.com |
| 3 | www.College1.edu |
| 4 | www.Business3.net |
| = |  |
| = |  |
| = |  |
| 100 | www.user1.com |

FIG. 8B

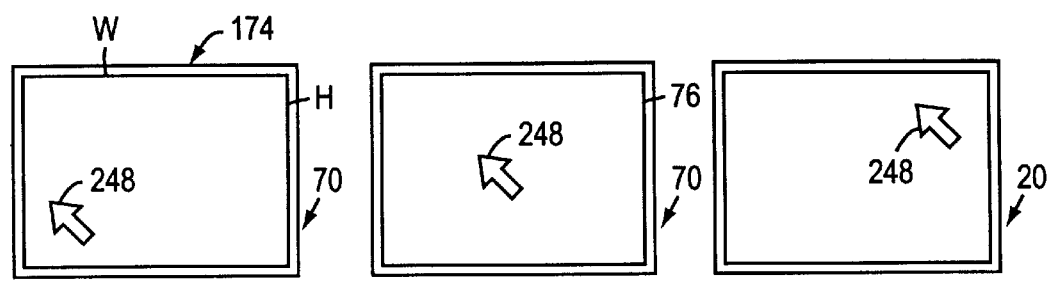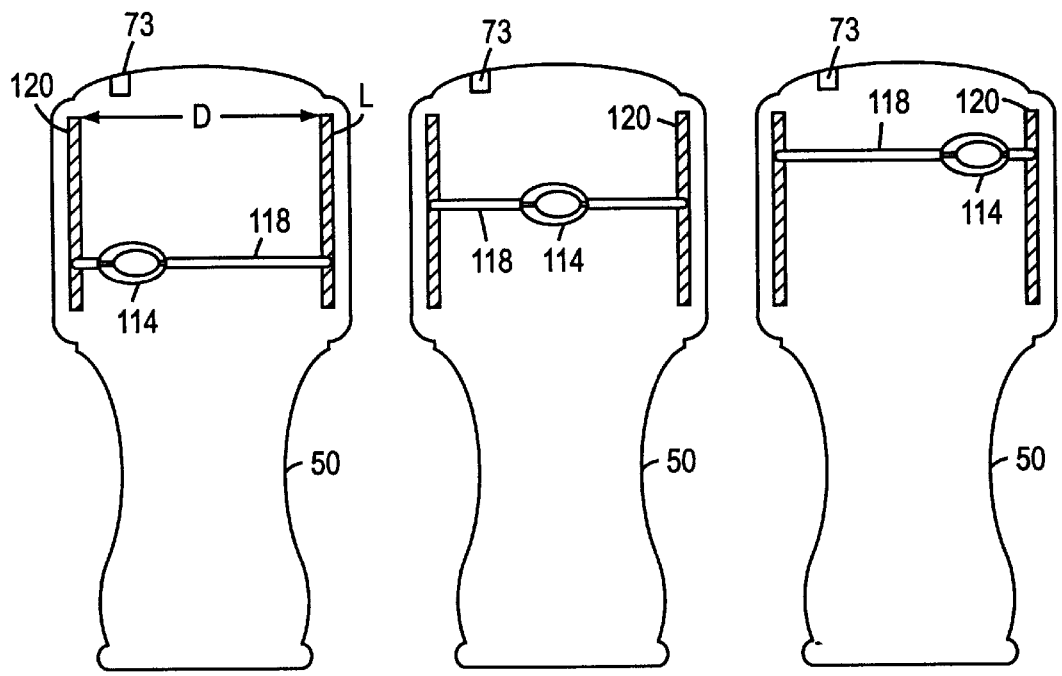
FIG. 11A  FIG. 11B  FIG. 11C

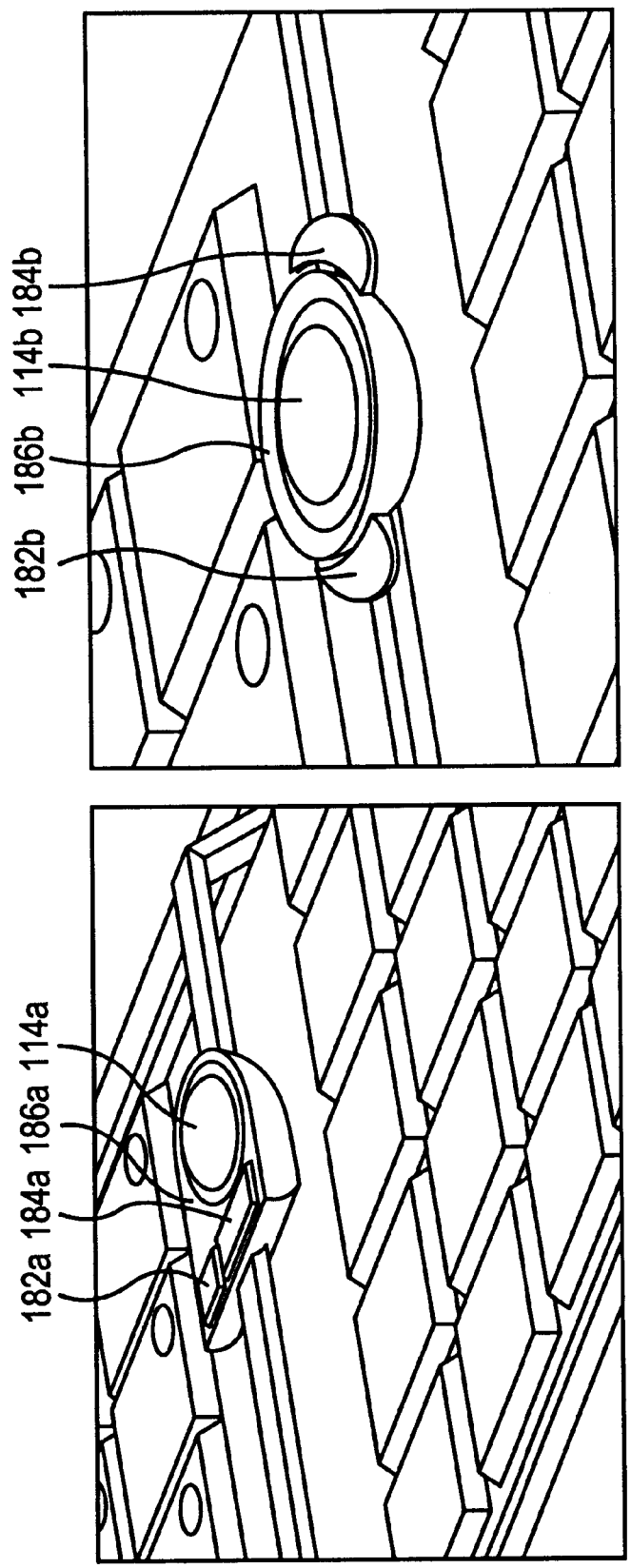

SYSTEM AND METHOD FOR CONTROLLING AND INTEGRATING VARIOUS MEDIA DEVICES IN A UNIVERSALLY CONTROLLED SYSTEM

FIELD OF THE INVENTION

The present invention relates to the operation and control of different systems in a multimedia environment and relates to a remote input control device for controlling operations within this environment.

BACKGROUND OF THE INVENTION

Electronic entertainment and other media devices, such as televisions and video cassette recorders (VCRs) have become standard appliances in the home and work environment. Another electronic media device which is becoming a norm in the home and work environment is the computer. Computers have come to be a standard tool in facilitating communication and processing data in many environments. In some home environments, the occupants own from one to three computers and own from one to four televisions. Computers are typically located in a home office or a study room of the home. However, televisions are typically located in areas of the home where guests or family members congregate. In many home environments, it is not often that television sets and computers are located in the same room because of space limitations and because it is not economically practical to provide both televisions and computers in each room where either of the devices could possibly be used. For these reasons, these devices are usually distributed in the different rooms of the home where they are most likely to be used.

In office environments, computers are located at the desk or work station of employees. However, televisions or video monitors are used or maintained in conference rooms. Conference rooms typically do not have dedicated computers, and employee workstations typically do not have televisions. Given the economic and space considerations of providing computers and televisions within the same room, users of these media devices have been limited to using the functions of one device in a dedicated room. Thus, there is a need for a method and system that enables users to more conveniently view or have access to a desired media type in various rooms without the necessity of providing a distinct physical unit for each media type in a given room.

Just as computers have become the norm, certain methods of interacting with computers have become "somewhat" the norm. Typically, when a user desires to have a function implemented on a computer, the user inputs commands through a keyboard and/or a separate pointer/selection device. The alphanumeric keyboard is used primarily to input text information into a computer system. The position at which text is entered may be indicated by a blinking character generally termed a cursor. The cursor position can be moved or positioned to different places on the computer screen by "arrow" direction buttons located on the keyboard. This method of moving the cursor to different positions on the screen is cumbersome and slow because only one of four direction buttons can be selected at a single instance and the position of the cursor can only be moved in vertical and horizontal directions. A more widely used pointer/selection control device is termed a mouse. With a mouse, the cursor position can be moved in any direction by moving a pointer/arrow on the display screen and then depressing a button on the mouse, sometimes referred to as "clicking" to activate a function associated with the position of the pointer.

A typical mouse includes a casing with a flat bottom and a rounded upper shell that is designed to be gripped by a user's hand. On the upper shell, one or more buttons may be found that are selection control buttons. On the bottom of the mouse, there is an exposed ball that is free to rotate about any axis. Pushing the mouse across a desktop surface causes the ball to rotate and this movement is converted into electrical direction signals. A cable usually extends from the mouse to couple the directional signals to a computer system which uses the signals to control a cursor.

The mouse is a relative pointing device because there are no defined limits to the mouse's movement and because the mouse's placement on a surface does not map directly to a specific screen location. When a user desires to select items or choose commands on the screen, a user presses a selection control button to select the item or choose a command. While the mouse has served as a very useful tool for controlling an on-screen cursor and selecting options displayed on a computer screen, the mouse has some drawbacks. When moving the mouse on a desktop, the cable of the mouse often extends across a portion of the desktop and interferes with paperwork, pencils or other materials that are on the desk. Additionally, a certain amount of level desktop space must be dedicated so that the mouse can be moved around to direct the pointer on the display screen. Due to the level desk space that must be dedicated to a mouse, the mouse cannot be easily used in environment where level space is not available or where the environment is unstable such as in an airplane.

Other pointer/cursor control devices have been used in different type computer systems. Particularly, in a portable computer systems, touch pads are often used. The touch pad typically uses sensors to convert finger movement across the surface of the touch pad to directional signals that are used to cursor movement. A touch pad is typically located on a dedicated surface area of a keyboard or coupled to a computer to facilitate movement of the pad.

Another type pointer control device is a track ball device. This device partially encloses a ball within a housing so the upper surface of the ball is exposed. Like the mouse, rotation of the ball is converted to electrical directional signals that are used by the computer to guide a cursor. A track ball also has selection control buttons, typically located adjacent the exposed ball, for selecting an object displayed on the screen. Track ball devices may be provided as a unit external to the keyboard or mounted in proximity of a keyboard especially in lap top computers. Consequently, a track ball device occupies either an amount of desk space or a portion of the keyboard space.

Although various types of pointer control mechanisms are in use, there are drawbacks to each of these devices. One of the primary drawbacks of the devices is that they require a considerable amount of space to be available on a person's desktop, working area or keypad in order to use the device and many of these devices are bulky. Given the space requirements for these devices, these type pointer control mechanisms are not practical in environments where space is limited. Thus, there is a need in the art for a device that can be used in conjunction with the basic keyboard structure without requiring a designated area of the keyboard or desk space to be utilized only for that pointer control mechanism.

The problems associated with existing cursor control mechanisms for computer systems are exacerbated when considered for use with technology convergence appliances. For example, technology convergence is expected to permit cable television systems to provide Internet access as well as cable television programming through a television set. Control of a television is typically achieved with a remote control device having numeric keys, four directional buttons, and some function control keys. Because technology convergence may include text input and cursor control, a user may be required to use a remote control, a keyboard, and a cursor control device. Coordination of these devices and their mobility in an area where the television is used would likely be difficult. Consequently, there is a need in the art for a control device that can be effectively and efficiently used to control operations of a technology convergence appliance.

SUMMARY OF THE INVENTION

Generally described, the present invention provides a method and system which enables wireless communication and control of various media in an integrated system. One aspect of the system enables a television monitor to serve as both a television and computer by receiving computer system control and video signals from a computer system in another room. The computer system may carry out independent computer functions for a user at the location of the computer system while generating computer functions and video signals to a user at the television monitor in another room. The present invention also provides a remote control for controlling the operations of various media devices through a home broadcasting unit which generates wireless signals to media devices of the system.

The universal media system coordinates operation of various communication media devices. The system receives control signals at a signal broadcasting unit which controls operation of various communication media devices. When the broadcasting unit receives the control signals, the unit generates a wireless communication to a computer system. In response to the command signal from the broadcast unit, the computer system invokes a computer operation corresponding to said wireless control signal. The computer system executes the requested computer program and transmits a wireless response signal to the broadcasting unit to display the video signals generated in response to the initial control signal. The window on the television screen displays the computer program being executed by the computer system within the window.

The computer programs that can be executed by the computer system and displayed at the television monitor include but are not limited to Internet programs, e-mail programs, and calendar programs. Preferably, the system is used in connection with a remote control that has a QWERTY type keyboard. The functions of the keyboard can be switched from general letter input to functions that directly access Internet addresses, sections within an Internet site, or television channels in television mode. Additionally, the remote control may have a telephone function with a separate numeric keypad. The remote can serve as a speaker phone in the system, with the broadcasting unit generating signals to telephones of the system. In addition to a telephone function, a calculator function may be invoked from the remote control for display on the television monitor. When the calculator function is implemented, the numeric keypad switches to a calculator input mode.

Another aspect of the invention includes a cursor control device that can be efficiently integrated into a keyboard. Preferably, the cursor control device of the present invention may be positioned over the keys of a keypad without significantly degrading user access to the keypad. The cursor control device includes a housing, a guide bar, and a pointer position guide. The guide bar is coupled to the housing so it may be moved in a first direction on the housing. The pointer position guide is aligned on the guide bar so it may be moved along the guide bar in a second direction. Movement of the guide bar and the pointer position guide generates directional control signals corresponding to the first and second directions, respectively. The directional control signals are used in a known manner to control movement of a cursor on a display screen. The cursor control device of the present invention may be mounted over the keys of a keypad. This integration of the keypad and cursor control functions in the same area of a keyboard provides spatial efficiencies not previously known.

In an alternative embodiment, the housing unit may be a remote control unit with a set of function keys for selecting one of a plurality of modes of operation of an integrated television/computer system. The function keys may be used to select a television mode, computer network communication mode or a video cassette recorder mode. The housing may also be provided with a QWERTY style keyboard over which the cursor control mechanism moves.

Preferably, slots for the cursor control device are defined in the housing. Each slot receives a guide track and the movable guide bar has each end coupled to a guide track to orient the guide bar in a direction generally orthogonal to the length of the slots. The length of the slots establishes the movement limit for the guide tracks. Coupled to the guide bar is the pointer position guide which moves along the length of the guide bar between the guide tracks. The movement of the pointer position guide along the guide bar and the movement of the guide bar along the length of the slots define the first and second directions for the directional signals used to control the displayed cursor.

Thus, it is an object of the present invention to provide a system for centrally controlling operations of various media devices of the system. It is another object of the present invention to provide a cursor control device that does not require a designated area of the keyboard or desk space to be utilized only for cursor control device. It is also an object of the present invention to provide a remote control device that can be used to select and control different functions in a technology convergent appliance. These and other objects of the present invention will be apparent to those skilled in the art in view of the figures and descriptions provided herein.

BRIEF DESCRIPTION OF THE DRAWINGS

FIGS. 4a and 4b are diagrams of a removable transmitter/receiver that plugs into a television set.

FIG. 8a and 8b are tables that associate internet addresses with selected characters for use in accessing internet addresses.

FIGS. 11a, 11b and 11c are diagrams of the pointer control mechanism of the preferred embodiment used to control the pointer position on a computer screen monitor.

FIGS. 12a and 12b are detailed views of the pointer position guide of the pointer control mechanism.

FIG. 15b is a view taken along line 15b—15b of FIG. 15a.

FIG. 16b is a view taken along line 16b—16b of FIG. 16a.

DETAILED DESCRIPTION OF THE INVENTION

Figure 1:
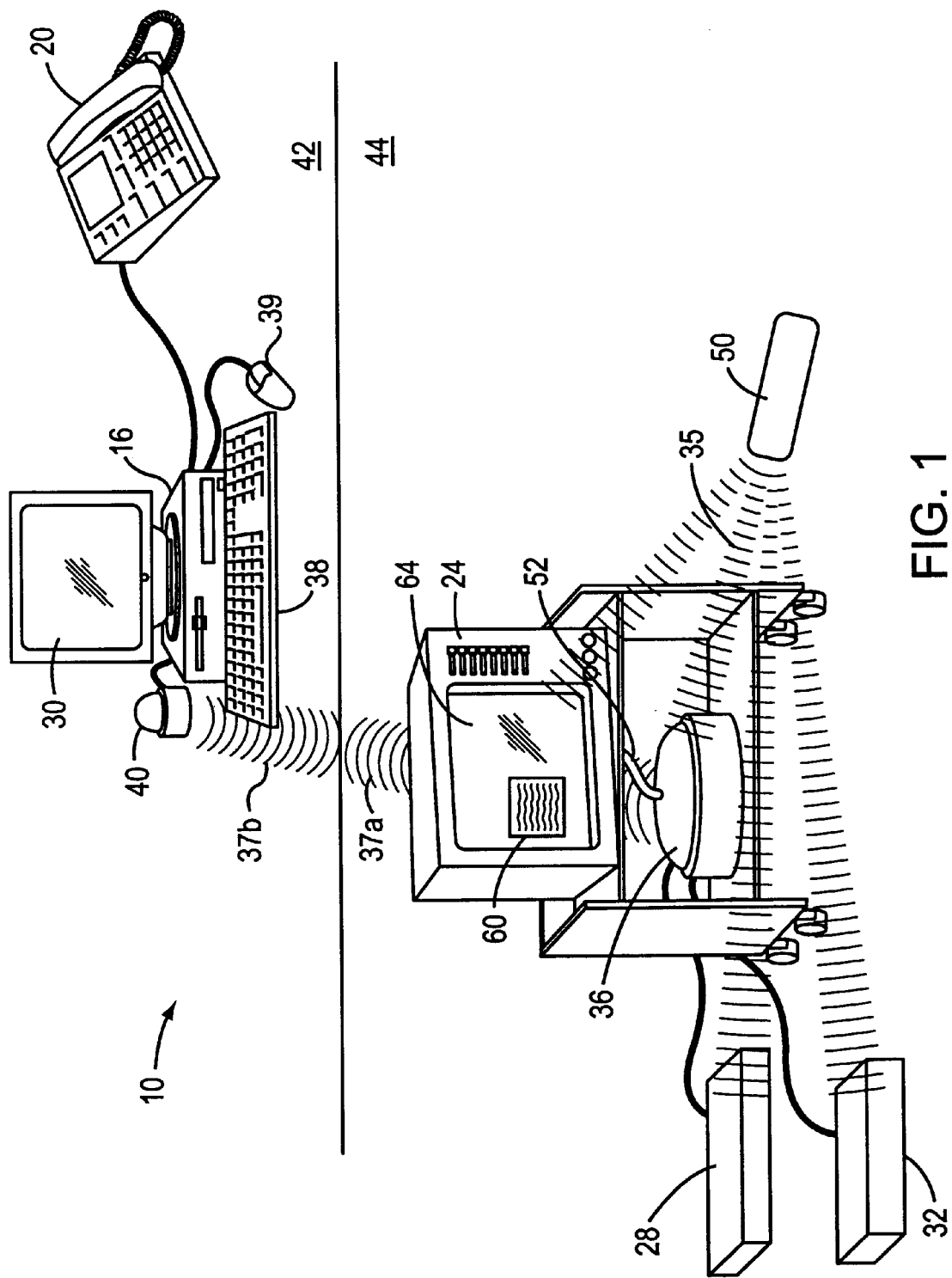
FIG. 1 is a diagram of the universal remote control system of the present invention.

Turning to the Figures, descriptions of the embodiments of the invention are provided in connection with the accompanying text. Referring to FIG. 1, a universal multimedia system 10 is illustrated. The universal multimedia system 10 includes a computer system 16, a telephone 20, a television 24, a television signal receiving box 28, a video cassette recorder ("VCR") 32, a home broadcasting unit 36, a computer signal transmitter/receiver 40, and a remote control unit 50. The computer system 16 includes a display monitor 30, keyboard 38 and mouse 39. The home broadcasting unit 36 manages operations of many devices including television signal receiving box 28, the VCR 32, the telephone 20, the computer system 16, and devices coupled to the computer system. Some of the devices, such as the computer system 16 and telephone 20, are located in a room 42 and other devices, such as the television 24 and home broadcasting unit 36, are located in a room 44. The universal multimedia system 10 enables a television, such as television 24, in conjunction with home broadcasting unit 36, to function as a remote computer system while maintaining its function as a television set. A user may interact with computer programs at the computer system 16 while another user may interact with computer programs displayed on the television 24, that are being executed on the computer system 16. The video data resulting from programs executing on the computer system 16 are transmitted to the home broadcast unit 36 by the computer signal transmitter/receiver 40. It should be appreciated that the home broadcasting unit 36 may be implemented as part of a computer system such as a computer system 16.

The home broadcasting unit 36 controls the information displayed on the television monitor 24 by coordinating signals from the computer system 16 and other devices. The initial commands or requests to begin execution of a computer program at the computer system 16 may be initiated from a remote control 50 via the home broadcasting unit 36. The home broadcasting unit 36 receives wireless commands 35 from the remote control 50 which are converted to wireless signals 37a at a frequency suitable for transmission to the computer system 16. Television sets and other devices such as telephones and speakers can be included in other rooms that also receive signals from the home broadcasting unit 36 as controlled by the remote control 50. By using the universal multimedia system 10, a user does not have to provide a separate computer system for each room in order to have access to computer functions and the operation of many multimedia devices may be controlled by the single remote control 50 and single home broadcasting unit 36.

The home broadcasting unit 36 and television 24 are enabled to function as a computer system by receiving wireless signals from the computer system 16 transmitted via the computer signal transmitter/receiver 40. The computer signal transmitter/receiver 40 preferably includes circuitry of the type commonly used in wireless telephones that are used in the home to generate and receive wireless signals. Similarly, the home broadcasting unit 36 includes wireless communication circuitry of the same type. Initiation of operation of the computer system 16 can be controlled by the remote control 50 which has a keyboard and control keys, as discussed in more detail herein. The remote control 50 transmits the wireless signal 35, preferably line-of-sight/infra-red, to the home broadcasting unit 36 which then converts and transmits the signals 37a to the computer transmitter/receiver 40. The home broadcasting system 36 converts the request signal from the remote control 50 to a 900 MHz signal, or other suitable non-line-of-sight signal, for transmission to the computer system 16. The computer transmitter/receiver 40 provides the control signals from the remote control 50 to the computer system 16. The control signals are processed by a CPU, programs and/or a dedicated I/O board of the computer system 16, and wireless response signals 37b of video data/graphics are transmitted to the home broadcasting unit 36 by the computer transmitter/receiver 40. The home broadcasting unit 40 converts the response wireless signals 37b to a form or format suitable for processing by a selected media device and transmits, in this case, the signals received from the computer system 16 to the television 24 for display via a connection line 52. Preferably, the television 24 is of the type which supports "picture-in-picture" display as known by those skilled in the art. The signals generated from the home broadcasting unit 36 may be displayed in a window 60 on the television screen 64. The display of the window 60 may be termed a "picture-in-picture" view because the areas outside of the boundaries defining the window 60 may contain other video data displayed from another media source of the universal multimedia system 10. The other sources of video data may include the VCR 32 or television signals received from the television signal receiving box 28. The remote control unit 50 may control the operation of the VCR 32 and television signal receiving box 28 directly or via the home broadcasting unit 36 for display on the television 24.

Figure 2:
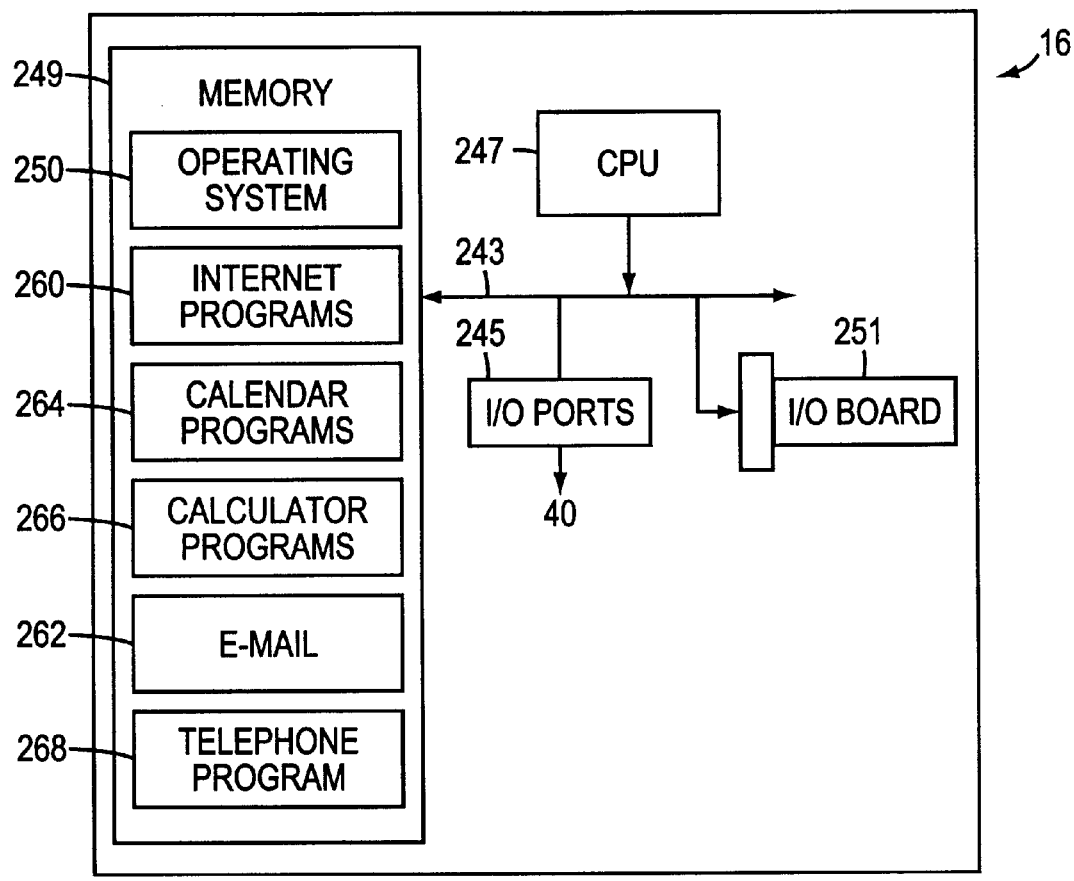
FIG. 2 is a diagram of a computer system operating according to the principles of the present invention.

Referring to FIG. 2, the computer system 16 is shown in more detail. The computer system 16 has a central processing unit (CPU) 247 to implement the various requests for execution of programs initiated according to the principles of the present invention. The programs which may be executed in conjunction with the steps of the present invention are stored in a memory 249. Those skilled in the art will appreciate that the memory 249 is representative of both read-only and random access memory. The central processing unit is preferably a Pentium II processor available from Intel Corporation in Santa Clara, Calif. or any processor that supports dual processing. A bus 243 supports data communications between the CPU 247 and other components. The computer signal transmitter/receiver 40 is connected to an input/output port 245. Additionally, an input/output board 251 may be connected to an expansion slot of the computer system 16 which contains memory elements and other processing chips to support computer program requests from and send transmissions to external devices of the universal multimedia system 10. The processes of the input/output board are coordinated with the CPU 247 for receiving and sending command signals via the computer signal transmitter/receiver 40. The memory 249 contains an operating system 250, an Internet program 260, e-mail program 262, calendar program 264, calculator programs 266, and telephone programs 268. The internet programs may include all programs necessary to establish an internet connection and to search the internet, such as internet service provider specific software, browser programs, and other programs that facilitate internet use.

Most computers, such as computer 16, are coupled to a network through a network communication printed circuit card which is typically resident within each computer system. This communication card typically includes processors, programs and memory to provide the electrical signals for transmission of data and implement the protocol which standardizes the messages transmitted through a network. To communicate data from a user's application program or operating system service, a protocol stack is typically implemented between the communication card for the network and the operating system services and application programs.

The typical protocol stack used on most open networks, such as the Internet, is a Transport Control Protocol/Internet Protocol ("TCP/IP"). This protocol stack includes a transport layer which divides a data stream from an application program or service into segments and which adds a header with a sequence number for each segment. The TCP segments generated by the transport layer are passed to the Internet Protocol ("IP") layer. The IP layer creates a packet having a packet header and a data portion. The data portion contains the TCP segment and the packet header contains a source address identifying the computer sending a message and a destination address identifying the computer for which the message is intended. The IP layer also determines the physical address of the destination computer or an intermediate computer, in some cases, which is intended to receive the transmitted message. The packet and the physical addresses are passed to a datalink layer. The datalink layer typically is part of the program implemented by a processor on the communication card and it encapsulates the packet from the IP layer in a datalink frame which is then transmitted by the hardware of the communication card. This datalink frame is typically called a packet.

Figure 3:
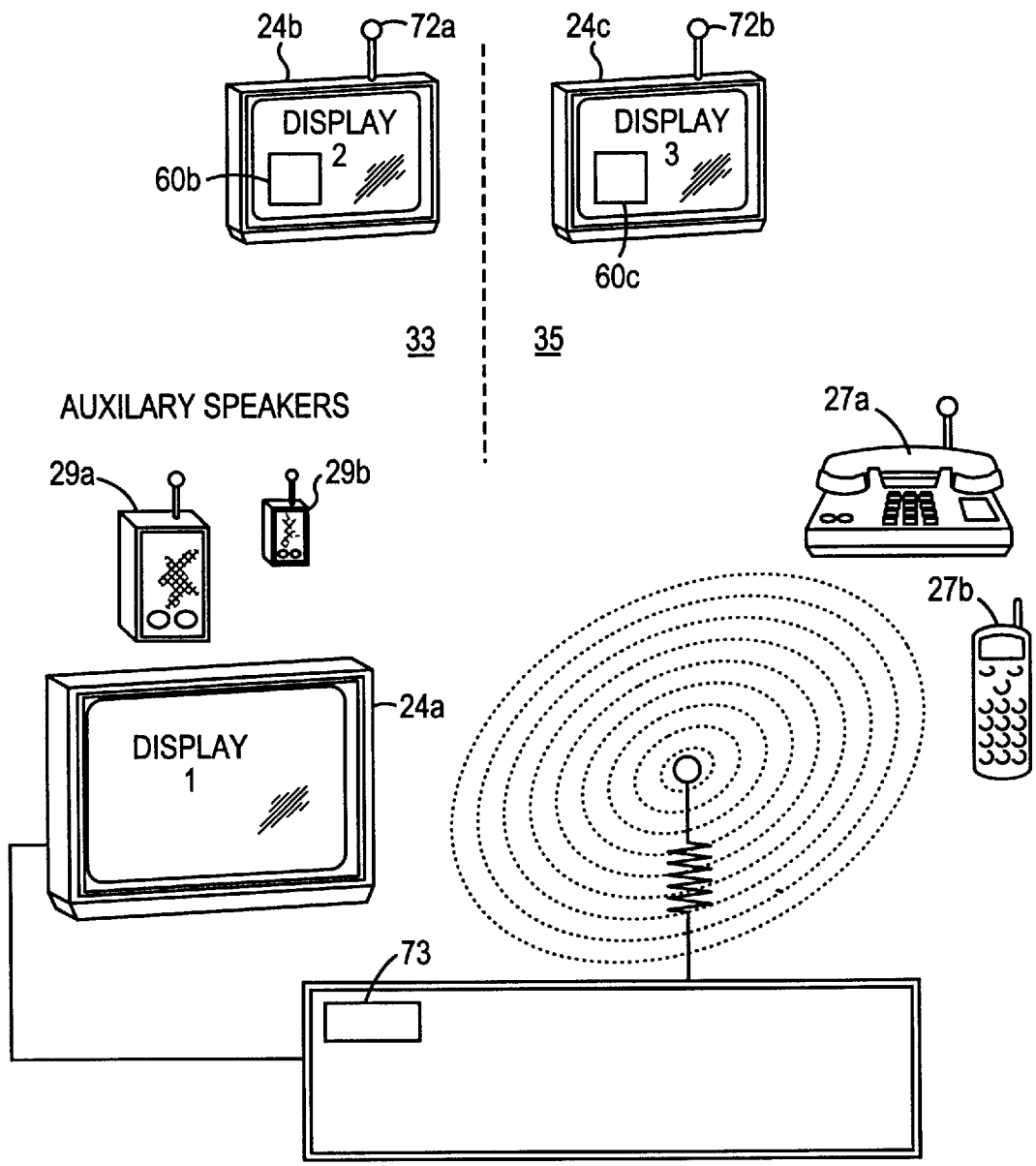
FIG. 3 is a diagram of the home broadcasting unit communicating wireless signals to remote televisions and other devices.

Referring to FIG. 3, the home broadcasting unit 36 is shown transmitting wireless signals to several display units or televisions 24b and 24c, telephones 27, and speakers 29. The home broadcasting unit 36 and the computer system 16 communicate with each other using 900 MHz signals which do not require line-of-sight signals to establish communication. The home broadcasting unit 36 contains a central processing unit, memory, and program modules which enable the unit to process the control signals received from the devices of the universal multimedia system 10 and to send signals to the appropriate devices. The televisions 24b, and 24c may receive signals from a computer system 16 via the home broadcasting unit 36 as described above in connection with FIG. 1. These display televisions may be in various rooms 33 and 35 of the home. It should be appreciated that the video signals from a VCR or other devices located in one room may be displayed on a television in another room with the signals being processed and coordinated for transmission by the home broadcasting unit 36. The wireless signals are received at the televisions 24 from the home broadcasting unit 36 via antennas 72. These signals are converted to the appropriate format and used to display computer processing data or other video data. The signals or data displayed on the televisions 24b or 24c may be from the VCR 32, computer system 16 or television signal receiving box 28. The information from the computer system 16 may be displayed in "picture-in-picture" windows 60b or 60c while video information from the VCR and television are displayed on the display screen of the television as a background picture surrounding the window.

As illustrated, the home broadcasting unit 36 may be used as part of a telephone system in conjunction with telephones 27a and 27b. As discussed in more detail below, the remote control 50 can control certain telephone functions and serve as part of a speaker phone system in conjunction with the home broadcasting unit 36. The home broadcasting unit 36 may also transmit audio signals to auxiliary speakers 29a and 29b. The signals transmitted to the auxiliary speakers 29a and 29b may be audio signals from a television, a VCR program, Internet program, or any other systems operating in conjunction with the home broadcasting unit 36. Each of the individual devices operating within the universal multimedia system 10 may have its own specifically designated code which enables the home broadcasting unit 36 to differentiate signals received from a particular unit or transmitted to a particular unit. The unique identification codes enable the devices of the system to identify and process the specific frequency or signal intended for the unit for the display of video data, playing of audio sound, or control of other functions of the device receiving the wireless signal.

Referring to FIGS. 4a and 4b, the back panel of a television 24 is shown. It should be appreciated that the televisions 24 may be digital or analog televisions. The universal multimedia system 10 of the present invention accommodates interaction and display of information to the televisions 24b or 24c by providing a detachable receiver/transmitter 70. The detachable receiver/transmitter 70 is a plug-in unit that plugs into the standard cable or television reception connection port 80 of a television or monitor. This port may be a specifically designated port other than a cable port that is connected to circuitry operative to convert the signals received from the control devices, such as the broadcasting unit 36. The detachable receiver/transmitter 70 has an antenna 72 and a body unit 74 which plugs into the connector port 80. The detachable receiver/transmitter 70 is attached to and is self-supported on the television unit by the connector 82a. The body unit 74 houses the signal conversion circuits for converting the wireless signals from the home broadcasting unit to signals appropriate for input to the cable port of the television. Circuits for converting the wireless signals to electrical signals which can be processed by the television 24a are known and are not necessary for an understanding of the invention. The body unit 74 has a connector 82a which plugs into the port 80 of the television. The detachable receiver/transmitter 70 may include a battery for powering its circuits. This detachable receiver/transmitter 70 may be used with a variety of television monitors. It should be appreciated by those skilled in the art that the same type single piece plug-in signal converter and receiver unit 70 may be used with the telephone 27 or with the speakers 29. The units convert the wireless signals to the appropriate signals for the media device for which use is intended and have the appropriate connectors for plugging into the jacks of the device. These detachable transmitters/receivers are also self-supported on the unit by a connector. In the case of a detachable transmitter/receiver for the speakers, the connectors are typically wires and a separate more rigid connection device may be used on the body unit to support the detachable transmitter/receiver.

Figure 5A:
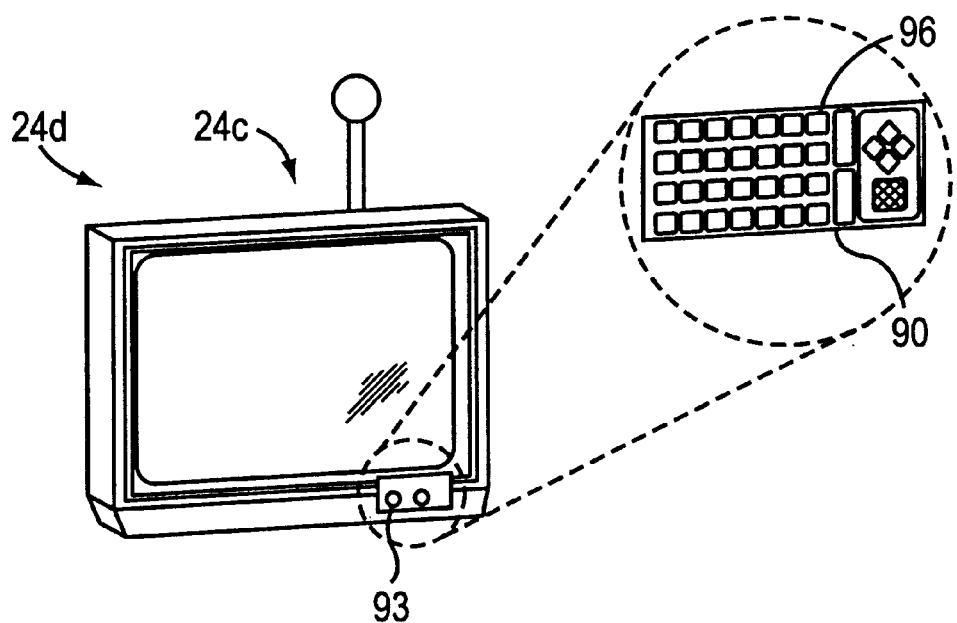
FIGS. 5a and 5b are diagrams of a removable remote control unit of a television set.
Figure 5B:
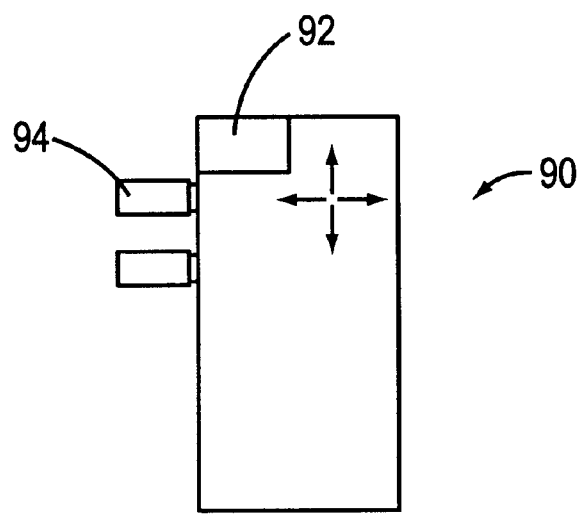

Referring to FIG. 5a, a television 24c is illustrated. The television 24c has a removable control 90 that functions to control operations of the television 24c and/or other any media devices coupled to the television 24c. The removable control unit 90 may plug into the television 24c and control operations directly when plugged into the television. In addition to controlling operations when directly connected to the television 24c, the removable control unit 90 may be removed from the television 24c and serve as a remote control unit. As shown in FIG. 5b, the removable control unit 90 has a wireless transmission unit 92 which transmits wireless signals to the television set when the connectors 94 of the control unit are not plugged into connector ports 93 of the television 24c. The wireless control signals of the removable control unit 90 control operation of the television 24c. The removable control unit 90 may be self-supported on the television 24c by the connectors 94. The wireless signals from wireless transmitter 92 may be infrared signals. The removable control unit 90 has controls 96 that are operative to perform the same type functions as associated with the keys 124, keypad 116 and other related functions of the remote control 50 as discussed in more detail in connection with FIG. 7a.

Figure 6A:
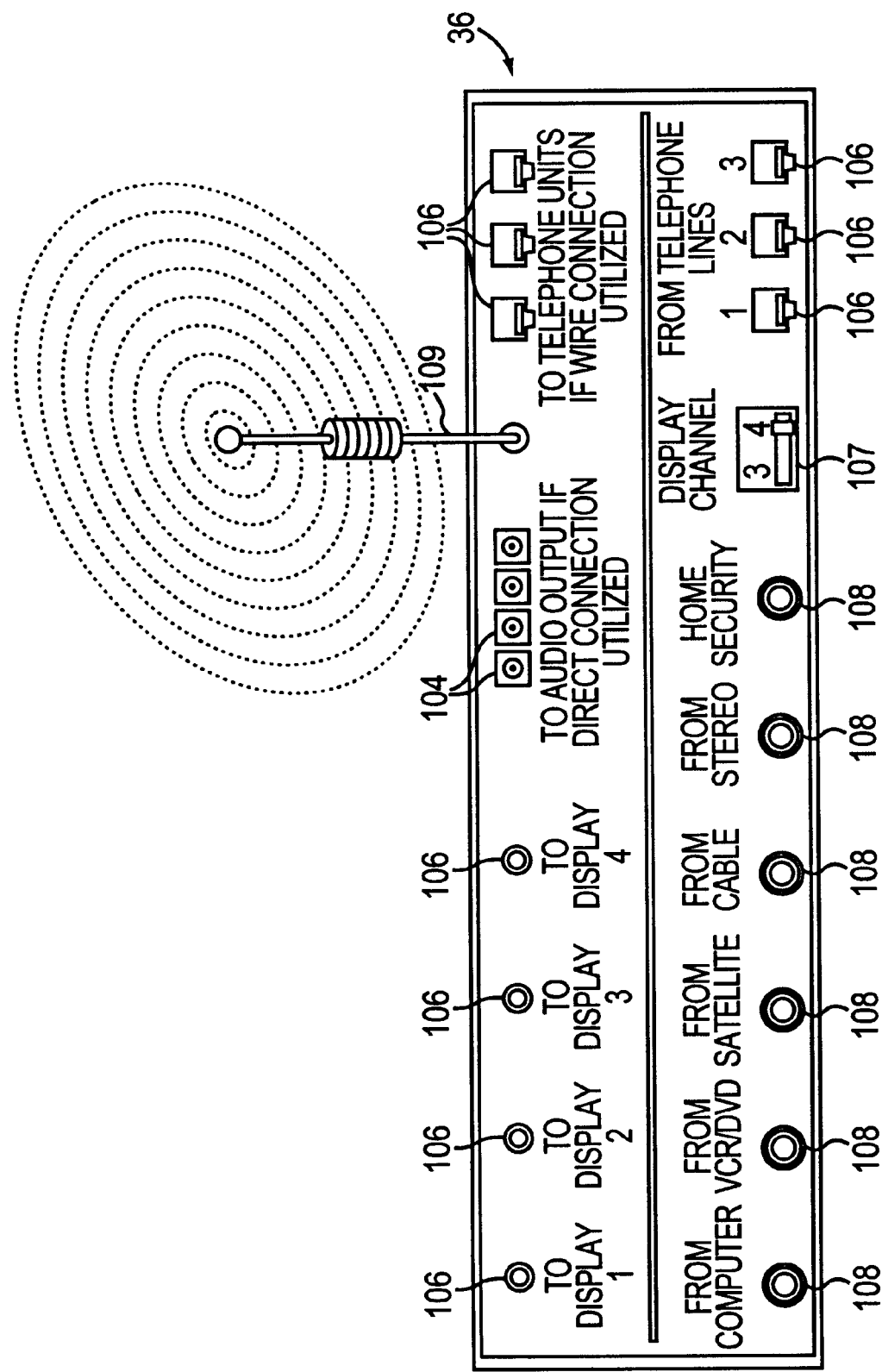
FIG. 6a is a diagram of the input and output ports of the home broadcasting system.

Referring to FIG. 6a, a detailed view of the functions available from a home broadcasting unit such as home broadcasting unit 36 is illustrated. The home broadcasting unit 36 may have input/output connectors 102 in which connections to televisions or display units may be made. Connection ports 104 may be used to connect directly to speaker systems. Telephone connection ports 106 are used for direct cable connection to telephone units. Various media ports 108 are operative to be connected to a corresponding media unit for operation with the home broadcasting unit 36. A switch 107 is used to select the channel upon which a television is to be set for operation. An antenna 109 is used to transmit command signals to the computer system 16 and to receive command signals from the computer system 16 for control of operations on the appropriate media device. The home broadcasting unit 36 has an infrared sensor 73 as illustrated in FIG. 3. The infrared sensor 73 receives signals from the remote control unit 50 that are processed as discussed above.

Figure 6B:
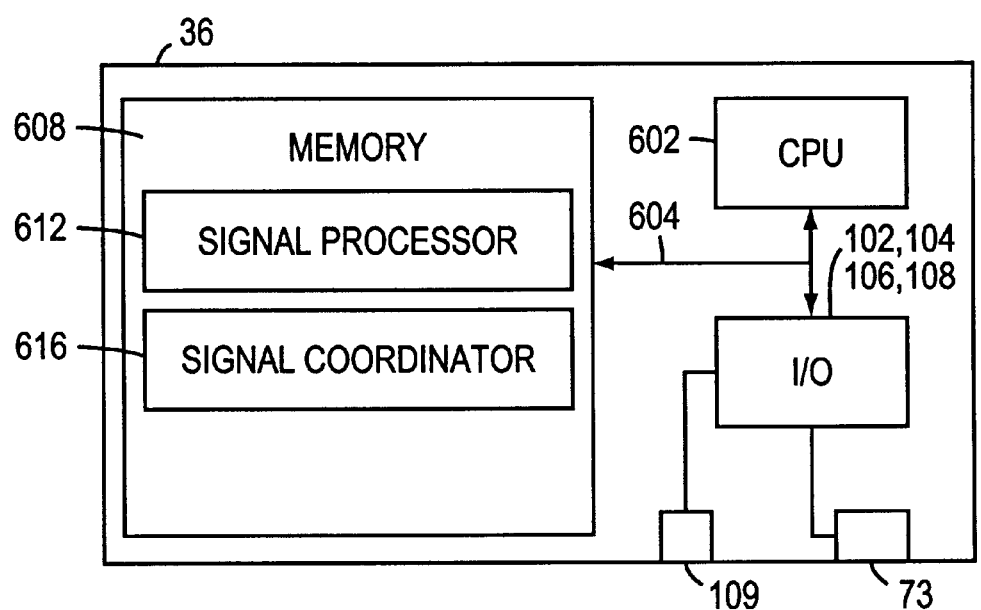
FIG. 6b is a diagram of components of the home broadcasting system.

Referring to FIG. 6b, the basic components of the home broadcasting unit 36 is illustrated. The home broadcasting unit 36 includes a central processing unit 602, and a memory unit 608. The home broadcasting unit 36 communicates with devices of the universal multimedia system through input/output ports such as ports 102, 104, 106, or 108. The IO ports are connected to the antenna 109 and the infrared transmitter/receiver 73. Those skilled in the art will appreciate that signal conversions circuits are utilized for processing the signals received and sent by the home broadcasting system 36. The memory 608 contains a signal processor unit 612 which processes signals transmitted and received from devices of the system. The signal processor may decode and encode signals with the unique number identifiers which identify the specific unit which transmitted a signal to the home broadcasting unit 36 or encodes a unique number in the signal that is to be transmitted a selected device within the system. The signal coordinator 616 coordinates the processing of the multiple signals that may be sent and received at the home broadcasting unit 36. It should be appreciated that the signal processor 612 and the signal coordinator 616 may be implemented as a single unit. Furthermore, the individual task of coordinating signals in the system may be handled by various computer modules as desired and/or used based on the particular model or variations of the home broadcasting system 36 being utilized.

Figure 7A:
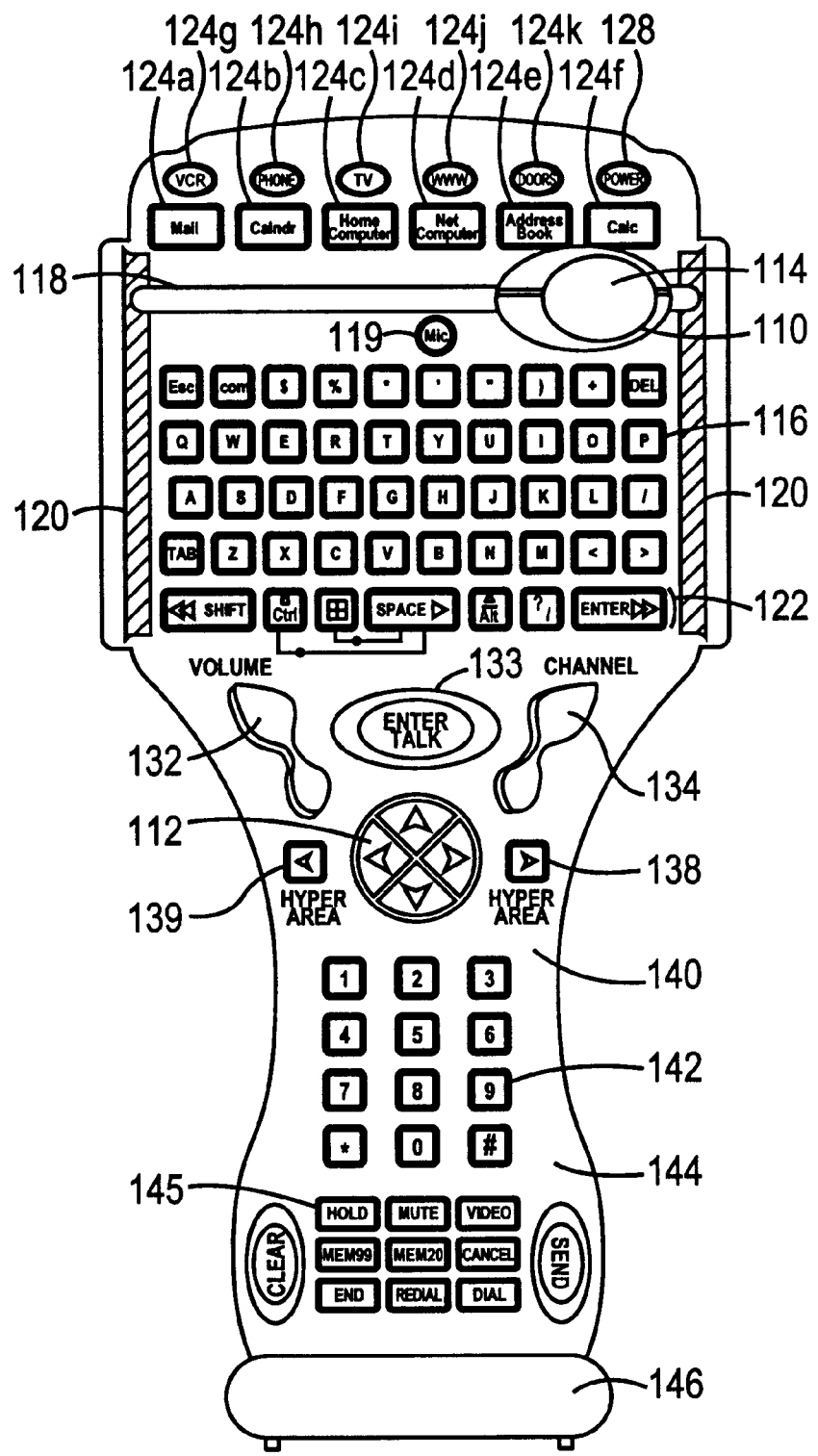
FIG. 7a is a remote control unit embodying a pointer control mechanism constructed in accordance with the principles of the present invention.
Figure 7B:
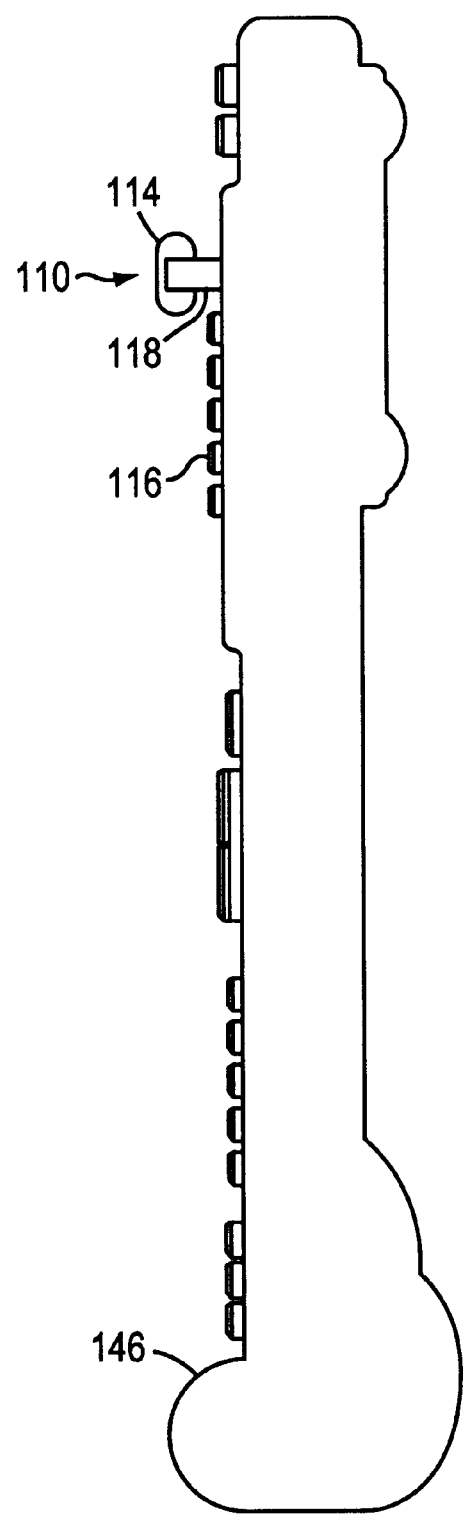
FIG. 7b is a side view of the remote control unit.

As discussed above, the remote control unit 50 is used to control many of the operations of the components of the universal multimedia system 10. Referring to FIGS. 7a and 7b, the remote control unit 50 that initiates many operations of the universal multimedia system 10 embodies a pointer control mechanism 110. The pointer control mechanism 110 may be integrated in the remote control unit 50 over a keyboard or a keypad 166. The pointer control mechanism 110 does not interfere with and extends above keys of the "QWERTY" keypad 116. The pointer control mechanism 110 includes a guide bar 118 that is coupled to track guides (not shown) mounted within slots 120 along the side of keypad 116. Located on the guide bar 118 is a pointer position guide 114. A cursor can also be controlled by standard type cursor control arrow buttons 112.

Referring to FIG. 7b, a side view of the remote control unit 50 is illustrated. The remote control unit 50 has an arm rest or protruding portion 146 which extends above the surface of the keys of the remote control unit 50. The protruding portion 146 serves as a hand or armrest for the user when the remote control is lying in the horizontal or resting position. This protruding portion also helps to prevent a user's arm or hand from accidentally depressing keys. This protruding portion 146 may also serve to balance the remote control unit 50 so that the remote control unit can stand in a vertical position.

The keypad 116 of the universal remote control unit 50 enables the specification of Internet addresses and other textual information. The remote control unit 50 includes a number of function keys 124 that enables the selection of various functions. Functions selected by the remote control unit 50 may include an E-mail function 124a, a calendar function 124b, a home computer function 124c, a net computer function 124d, an address book function 124e, a calculator function 124f, a VCR function 124g, a telephone function 124h, a television function 124i, a worldwide web shortcut function 124j, and a doors function 124k. An initial activation of the world wide web short cut function 124j causes the remote control 50 to generate a wireless signal to the home broadcasting unit 36 which then transmits a wireless signal 37a to the computer system 16 to activate the appropriate program as discussed above. An initial activation generally occurs when the Internet is not being accessed by the computer system. When the button 124j is pushed or selected, the cursor control mechanism 110 is activated. The cursor control mechanism 10 is activated anytime a function is activated that utilizes a cursor for selection control. When the internet access program is accessed, the computer system automatically dials the stored number of the internet access provider of the user and the password of the user can be automatically programmed to be input into the designated password field of the internet access provider. Alternatively, the user can input the password when prompted. As known to those skilled in the art, an internet browser is typically used to access the internet. Preferably, an internet browser program is invoked in response to activation of the www button 124j.

The world wide web short cut function 124j facilitates identification of names or Internet addresses without requiring a keystroke for each character. These short cuts include pushing a button that causes the characters "www." to appear in the domain name/address field. Each push of the world wide web short cut function 124j toggles through the following exemplary first level domain name extensions: ".com", ".org", or ".edu". When the "www" key 124j is activated, the function of keys of the keypad 116 may be programmed to be a direct access button to a user's favorite websites. A user can program the keys as desired. Users' assignments of letter keys to addresses is illustrated in FIG. 8a. These assignments can be stored in the memory of the remote control or may be stored in the computer system of an internet service provider. For example, the "y" key can be programmed to go directly to the "Yahoo.com" site. The doors key 124k provides direct access to specific locations within an Internet service providers operating system. The keys of the keypad 116 become direct access buttons for certain sites. For example, the "g" key can be programmed for games and the "e" can be programmed for encyclopedia. When the cursor is positioned in a field that is designated for input characters, the function of the keypad switches to its normal function as a text input keypad.

Another function available when the computer system accesses the internet is the ability to access web sites, as known to those skilled in the art, or internet access providers by numeric symbols rather than by the standard web site or internet protocol address letter designation. For example, an internet site or website for a major network could be accessed by simply inputting the number "15". Other network websites could be assigned the numbers "17", "19", or "21" for example. Therefore, a user does not have to input the standard address of "www.company@domainname" designation. Not only does this type of assignment of internet protocol addresses save key strokes in inputting the desired address but it enables a user to select a number that the user already associates with a company, particularly if the company is a television network broadcasting station.

If the internet number assignment function is available to a user, when the remote control 50 is used to activate an internet access program, the numeric keypad 142 is activated to function as the numeric input pad for preprogrammed addresses. Two embodiments of associating numbers to represent internet or world wide web (web) addresses are described herein. The assignment of numbers to web addresses may be controlled by a user or may be controlled by an authoritative body such as an internet service provider. A table of numeric assignments to internet addresses is shown in FIG. 8. In the user controlled embodiment, the user is provided with the option to specify a standard "company/user@domainname" address. When the user desires to set up his desired numeric choices for web addresses, the user directs the cursor displayed on the computer or television screen to a menu function which when selected initiates the processes to set up a user's number-web address associations. The process requests the user to specify the web address that the user desires to have associated with a numeric value. When the company/user@domainname is specified, the user is provided with the option of specifying a numeric value to be assigned to the address. When the user associates a numeric value with the identified web address, the association is stored in the memory of the remote control unit. A table (FIG. 8a) of assignments is stored in memory that represents the various numeric assignments of the user or users. Thus, after a user's table of addresses has been set-up, when a user inputs the web address by numeric value, a program module is executed within the remote control accesses the table. The address associated with the numeric value is located. The associated address is then wirelessly transmitted to the computer system 16 to access the web site identified by the address.

In an alternate embodiment, an authoritative body, such as an internet service provider, may assign numeric values to standard internet or web addresses. The internet service provider stores the assignments at the service providers computer system. In this embodiment, internet website owners or proprietors provide their web address to the internet service provider and request that the internet service provider assign a numeric value to the proprietors web address. Typically, the company or user desiring to have a web address assigned a numeric value would request a preferred numeric value. The internet service provider assigns the numeric values in view of the availability of the numeric value desired by the company or proprietor. Similar to the user programmed numeric assignments, the internet service provider creates a table in which numbers are assigned to the standard web addresses of the company or user. When an internet user desires to access the company by numeric value, the internet user inputs the numeric address in an address field of a browser and activates the search function of the browser. This address may be entered by a remote control as discussed herein. The internet service provider then accesses a table of numeric assignments from a database and retrieves the appropriate address. The retrieved address is used to access the site of the corresponding company.

By using a numeric identifier for web addresses, remote controls that do not have letter keys can be used to access web addresses. In such a system which enables a user to define internet or web address assignments where the remote control does not have letter keys or other embodiments, the association of addresses to numbers can be accomplished by using a computer system 16 to associate the number assignments to the standard format web address. The user may input the user's assignments in the computer system 16 via the keyboard 38. The selected assignments are preferably stored in a table in the memory of the computer system 16. When the computer is in an internet browser mode and a numeric value is chosen to be input in the browser address field, the numeric value is transmitted wirelessly from the remote control to the computer system 16. The table of associated addresses is accessed and the address associated with the number is used the input for the browser program at the computer system 16.

By enabling the user to directly program favorite or selected sites to be activated by a single push of a key of a keypad 116 or by using numeric values, the system of the present invention enables the Internet to be accessed by the push of a channel button. For example, a user may move from site to site simply by pressing a pre-programmed button which accesses the user's selected site. By enabling a user to directly program in web sites or sections within a web site for access by pressing a single key, the time required for a user to maneuver around the Internet is substantially decreased.

Referring again to FIG. 7a, when the VCR function is activated by pushing the button 124g, the functions of the bottom row of keys 122 are activated as VCR controls. The "double arrow" keys of the row 122 represent fast forward or rewind and the single arrow key may activate the play function of the VCR. Other VCR functions can be programmed as function keys on the row 122. When the remote control unit is not in the VCR mode, the keys serve their normal functions such as "shift", "space", or "enter" of the QWERTY keyboard 116.

When the phone key 124*h* is activated, the universal multimedia system 10 may serve as a telephone. The remote control 50 may serve as part of the telephone by activating a telephone 27 or by activating a telephone program in the computer system 16. The user may initially activate or answer the telephone mode of operation by selecting the "talk" button 133. Particularly, the remote control 50 has a microphone 119 which communicates voice communication from a user of the remote control 50 to the home broadcasting unit 36. The home broadcasting unit then transfers the voice communication to a telephone unit or computer system. By placing a microphone 119 on the remote control unit, the remote control system is able to operate as a speaker phone. However, the speaker phone system of the universal multi-media system 10 provides advantages that standard speaker phones do not provide. Specifically, the microphone 119 remains on during conversations between the user of the remote control and the party on the other end of the line. The incoming voice signal from the other party is played through the speakers of the television set and the speaker remains on at all times. Therefore, the system does not have to switch between speakers depending on the person talking the loudest or based upon which party began talking first. Consequently, there are no microphones switching sounds or blank out periods that occur as in typical speaker phone systems. Such switching between the calling parties can be annoying. It is not necessary to switch between speakers because the microphone for receiving the user's voice is close to the user whereas the voice that the user listens to comes from the television which is further away from the user than the microphone. Therefore, the voice being listened to by the user will be relatively weak at the microphone 119.

Also, when the phone button 124*h* is activated, the keypad 142 operates as a dialing pad for complete telephone functions in the universal remote control system 10 and telephone control keys 145 are activated. The telephone control keys 145 provide telephone functions such as automatic dialing of telephone numbers stored in memory and muting the sound during a telephone conversation. Software within the computer system 16 translates input from the keypad 142 in the phone mode and dials the appropriate number as used in a standard telephone or computer in a standard modem mode. Additionally, when the phone button 124*h* is activated, the functions of the keys of keypad 116 can be programmed to serve as direct dial phone numbers for family, friends or other frequently dialed numbers. For example, the S key can be programmed to automatically dial the telephone number of a friend named "Susan".

The VCR button 124*g* also turns on the television and the VCR. Current remote control systems typically require that the remote control be switched to a TV mode to turn on the television and then be switched to a VCR mode to turn on the VCR. However, the system of the present invention enables both the VCR and television to be turned on with a single push of a button. When the television button 124*i* is activated by pushing, the button will turn on the television and/or the television signal receiving box 28. When the television 124*i* is activated, the keypad 116 may be switched into a direct channel access mode. In the direct channel access mode, the keys of the keypad 116 may be programmed to go to a specific station by pressing a single button of the keypad. For example, the "P" key may be programmed to go to the local public broadcasting channel. The buttons along the row 122 change modes of operation and serve to control cable or satellite functions as typically available and as discussed herein. Specifically, the buttons may be used to change channels.

The activation of the mail button 124*a* causes a signal to be generated to the computer system 16 which accesses users voice mail, e-mail or faxes. The system may be programmed to automatically retrieve messages from an Internet service provider. As known to those skilled in the art, a computer system can be programmed as an answering machine and when the computer is programmed as such, the mail button may serve to generate voice mail responses to a user. Activation of the row of rectangular buttons 124*a*–124*f*, provides the information associated with activation of each button in a picture-in-picture window, such as the window 60 shown in FIG. 1. The functions associated with buttons 124*a*–*f* can be provided simultaneously with the television or VCR functions. The calendar button 124*b* displays a user's calendar as maintained at the computer system 16 in the picture-in-picture window 60. It should be appreciated that the window 60 may be expanded to cover the entire work space area of the display screen 64 (FIG. 1). The home computer button 124*c* activates the general computer operations available on the computer system 16. This includes displaying the operating system and files of the computer system as typically displayed on a computer monitor; however, the display is provided in the window 60.

The net computer button 124*j*, when activated, may go directly to a reserved hard drive which provides Internet access. In this mode, the keypad 116 serves a full function QWERTY keypad as used in typical computer applications. The address book function 124*f*, when activated, displays a user's address book in the window 60 (FIG. 1). The user may update the address book as needed. When the calculator 124*f* is activated, the keys 124 serve as a fall function numeric inputs to the calculator. When the calculator button 124*f* is activated, a calculator is displayed in the window 60. A user may then use the keypad 124 to calculate values as desired.

Other functions are associated with the remote control unit. The power control 28 enables the user to turn off or on a computer system coupled to a television set that the remote control unit 12 operates. When the remote control unit 50 is in the television channel mode, the control button 134 serves as a channel surf button. However, when the remote control unit 50 is in the computer mode, the button 134 serves as an up and down scroll button for moving a cursor.

Another function associated with the internet mode of operation facilitates a user's ability to make selections within a particular internet site or web page. When the computer system is in internet mode, the system provides a search function that aids in locating certain predefined text or links within a hypertext mark up language ("HTML") document or page. As well known, HTML documents pages, which are generated to display graphics and text of a particular internet or network site often contains short cut mechanisms ("hyperlinks") that enable quick access to other HTML pages or internet sites. These hyperlinks are embedded or programmed for selection at certain locations in the HTML page being displayed and are often indicated by text of a different color than the color presented. Hyperlinks can also be represented by graphic symbols. When a user selects a hyperlink, the internet address or network address associated with the hyperlink is accessed. In previously known systems, a user has to scroll down a screen to visually locate a hyperlink and then the user must direct a pointer to the position of the hyperlink text to select the text. This method of locating hyperlinks can be unnecessarily cumbersome. The system of the present invention overcomes the problem associated with the selecting of hyperlink text by providing hyperlink search controls 138 and 139. The hyperlink search controls enable a user to locate hyperlink addresses associated with a displayed HTML page by activating the forward search hyperlink control 138 or the backward search hyperlink control 139.

When a user selects either hyperlink control 138 or 139, the computer system locates the current position of the cursor and uses this position as the starting point for the search. If the user selects the forward search hyperlink control 138, the computer system searches for the first occurrence of a hyperlink address that occurs after the current position of the cursor. When the search function locates the hyperlink, the computer system highlights the hyperlink text or graphics located. The user may then activate the enter key of the keypad 116 or the selection control of the cursor control mechanism to select the address associated with the hyperlink text. Similarly, when the user selects the backward search hyperlink search control, the computer system searches backward from the current location of the cursor position for the first occurrence of the hyperlink text that occurred prior to the current cursor position. The located hyperlink text is then highlighted for selection by a user. Consecutive selections of either of the hyperlink controls 138 or 139 continues the search in the desired direction from the current position of the highlighted hyperlink. That is, the computer system will consecutively "jump" or move to successive hyperlinks of an HTML page as long as the user consecutively presses or actives a hyperlink search control. By using the hyperlink search controls, a user may easily maneuver through an HTML document to find related HTML pages or different internet addresses associated with the page without having to navigate a cursor control mechanism to position the cursor on the desired hyperlink.

The multiple functions of the remote control 50 of FIG. 7*a* has several program modules within the unit that transfers the appropriate control signals to a television set and the technologies integrated with the set. Preferably, the programs operating the remote control unit 50 transmit the control signals via a wireless method such as an infrared transmitter/receiver. Infrared transmission circuitry as utilized in the present invention is well known to those skilled in the art. Alternatively, remote control unit 50 or keypad with a pointer control mechanism 110 may be coupled to a television set or convergent appliance through a cable or the like.

Figure 9:
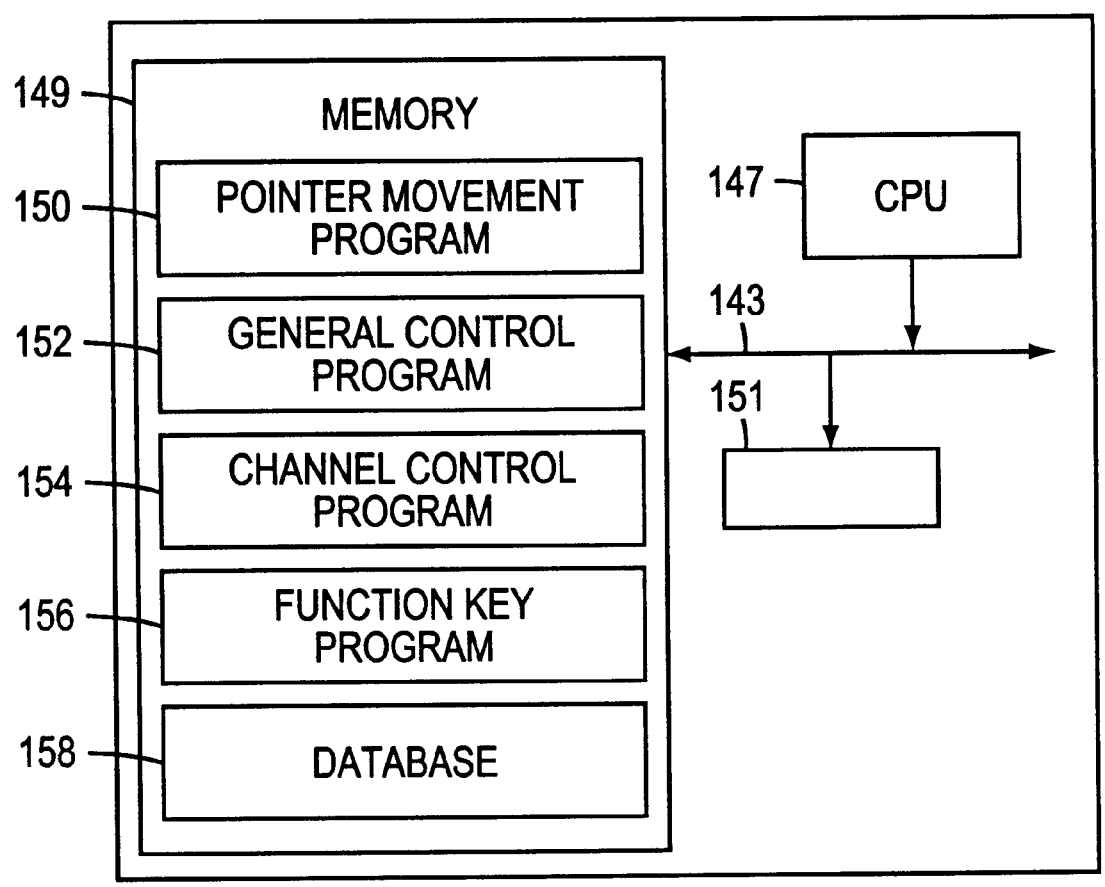
FIG. 9 is a diagram of the general circuitry of the remote control unit shown in FIG. 1.

Referring to FIG. 9, a general description of the internal circuitry of remote control unit 150 is illustrated. For simplicity of the drawings, many components of a standard remote control system have not been illustrated, because these elements are well known. A computer program executed by central processing unit (CPU) 147 to implement the various steps of the present invention is stored in memory 149. Those skilled in the art will appreciate that the memory 149 is representative of both read-only and random access memory. Programs may be stored in the memory 149 include a pointer movement processing program 150, channel control program 154, function key control program 158, and other control programs required for operation of remote control unit 50. A bus 143 supports data communications between the CPU 147, the input components mounted on the remote control unit 50, the control programs, and infrared transmitter/receiver 151. Infrared transmitter 151 converts electrical signals to infrared signals used to communicate with the television set or convergence appliance being controlled.

Figure 10A:
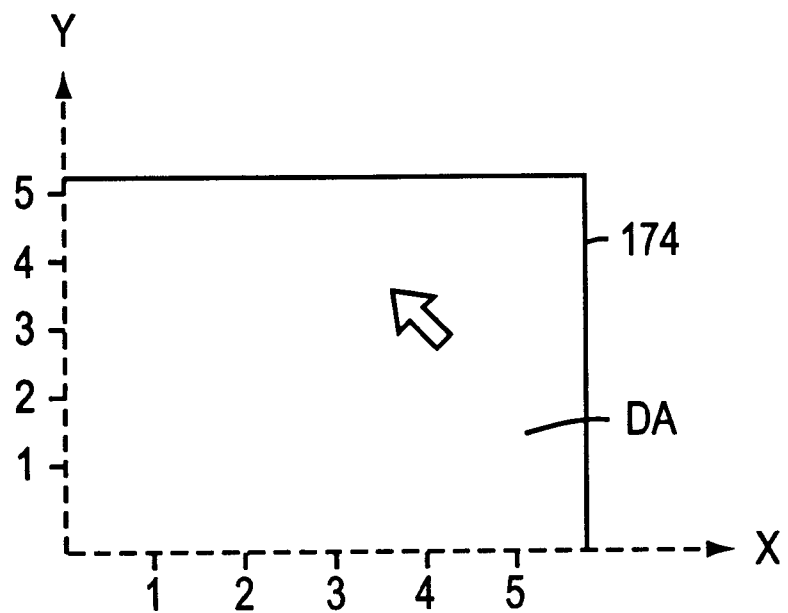
FIGS. 10a and 10b is a diagram of the correlation between an area defined by the pointer control mechanism of FIG. 1 and the display area of a computer screen.
Figure 10B:
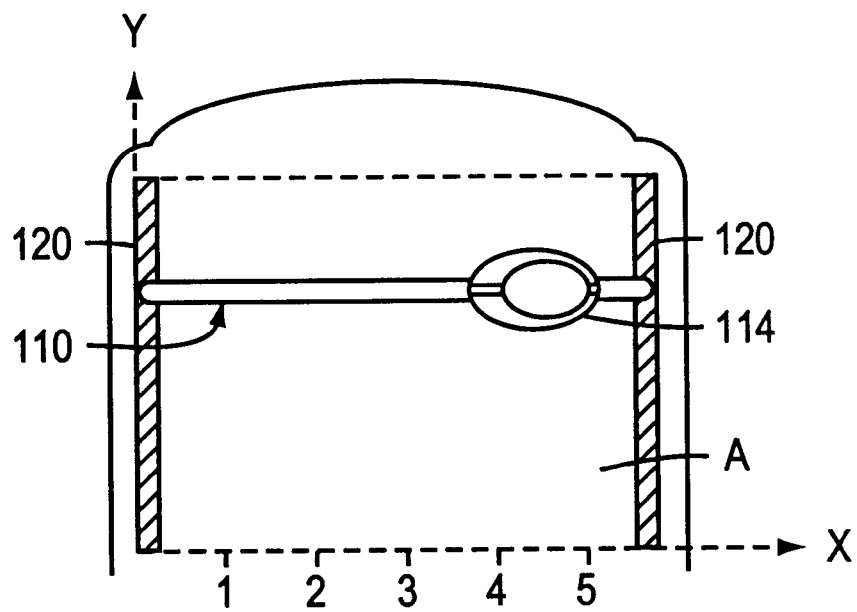

Referring to FIG. 10, the logical/physical correspondence between the area of operation of the pointer control mechanism 110 and a display screen 174 is shown. This display screen 174 may be represented as the window 60 as discussed in connection with FIG. 1. As known to those skilled in the art, a display screen may be divided into M×N elements generally known as pixels. A portion of computer memory 149 is organized as a rectangular array of elements to represent the pixels of the display screen 174. The pixels as defined by an area within the data 120 of the computer memory may be addressed in terms of Cartesian coordinates (x, y) corresponding to each pixel. Coordinate axis x and y are illustrated in connection with display screen 74. Area A defined by remote control unit 50 may be mapped to display screen area DA such that each location of the pointer position guide 114 within area A corresponds to a location within display screen area DA. Area A of remote control unit 50 may similarly be expressed in terms of Cartesian coordinates (x, y) and a transformation matrix of the point movement processing program 50 may be used to associate each x, y coordinate of area. As known to those skilled in the art, a motion transformation matrix translates the movement (location) of a cursor/pointer position guide to the corresponding location for the pointer on a display screen. The motion transformation matrix is part of the pointer movement processing program 150. Association of each point within the area A to location within the area DA is termed an absolute pointing system. In an absolute pointing system, the location of the pointer position guide 114 represents a specific position of a pointer on the display screen. The Area A is mapped to the area DA in association with the motion transformation matrix. Thus, the motion transformation matrix can provide a precise correlation between coordinates generated by pointed control mechanism 110 to x, y coordinates defining a location for an on-screen pointer. It should be appreciated by those skilled in the art that the present invention may be modified to be used as a relative pointing device. For example, a mechanism may be provided that disengages the pointer position guide 114 and/or the entire cursor control mechanism 110 which enables these members to be moved without moving the cursor or pointer. The mechanism may also be used to re-engage the pointer position 114 or cursor control mechanism 110 to control pointer/cursor movement.

Referring to FIGS. 11*a*, 11*b* and 11*c*, the remote control unit 50 is shown controlling a pointer on the integrated television/computer system such as the television 24*a* and the home broadcasting unit 36 (FIG. 2). The keys of the remote control unit 50 are not illustrated in FIG. 10 because they are not necessary for an understanding of the functions discussed in association with these figures. The remote control unit 50 communicates with home broadcasting unit 36 through infrared transmitter/receiver 72. Each of the FIGS. 11*a*, 11*b* and 11*c* show pointer control mechanism 110 of the remote control unit 50 positioned in different locations. FIGS. 11*a*, 11*b* and 11*c* represent one embodiment of the pointer control mechanism 110 in which the displayed cursor 248 and pointer position guide 114 are mapped directly to each other. Referring to FIG. 11*a*, the length L of the slots 120 correspond to the height H or vertical dimension of the display screen. The distance D between slots 120 corresponds to the width W of the display area or screen 70. Pointer position device 114 and guide bar 118 are mapped to the dimensions of the display screen so that the position of guide bar 118 and pointer position guide 114 define a position for the display cursor on the display area. As shown in FIG. 11*b,* when the pointer position guide 114 is positioned within the middle of the area A of the remote control unit 50, the pointer 248 is positioned in the middle of the display screen. Similarly, when pointer position guide 14 is positioned in the lower left hand position of the area A of the remote control unit 50, the pointer 248 is positioned in the lower left hand corner of the display screen (FIG. 11*a*). Likewise, when the pioneer position guide 114 is positioned in the upper right hand corner of the area A of the remote control unit 50, the pointer 146 is positioned in the upper right hand corner of the display screen (FIG. 11*c*).

Guide bar 118 of pointer control mechanism 10 slides along tracks within slots 120 to control the vertical position of pointer 248 on the display monitor. The position of pointer position guide 114 on guide bar 118 controls the horizontal position of pointer 248 along the display screen. Pointer position guide 114 may slide or move along the entire length of guide bar 118. By applying pressure on pointer position guide 114 in a horizontal and vertical direction simultaneously, the user directs pointer 248 to move in a diagonal direction. Thus, pointer 248 may be easily controlled and positioned on any area of the display screen utilizing the pointer control mechanism 10.

Referring to FIGS. 12*a* and 12*b*, a detailed view of pointer position guides are shown. The pointer position guide 114*a* is illustrated and has two selection control buttons 182*a* and 184*a* positioned thereon. Selection control buttons 182*a* and 184*a* operate in the same manner as selection control mechanisms on a standard mouse pointing device to select items on a display located at the cursor position on the display screen. A finger position pad 186*a* is provided on pointer position guide 114*a* and has a surface that helps prevent a user's hand or finger from slipping from the mouse. The pad 186*a* can made of any material that has a coarse surface consistency or that provides a gripping type surface. Preferably, the shape of the area containing the pad 186*a* is slightly recessed or concave to fit the contours of a person's finger. Referring to FIG. 12*b,* another embodiment of pointer position guide 114 is illustrated. Pointer position guide 114*b* illustrated in FIG. 12*b* may be termed a "bird". Pointer position guide 114*b* has selection controls 182*b* and 184*b* which operate in the same manner as selection mechanisms of a standard mouse pointer device. The selection controls 182*b* and 184*b* extend from the body of pointer position guide 114*b* like wings to give pointer position guide 114*b* the appearance of a "bird" hovering over remote control unit 50. Preferably, pointer position guide 114 of FIG. 12*b* has a recessed pad 186*b* for the placement of the hand or finger.

Figure 13:
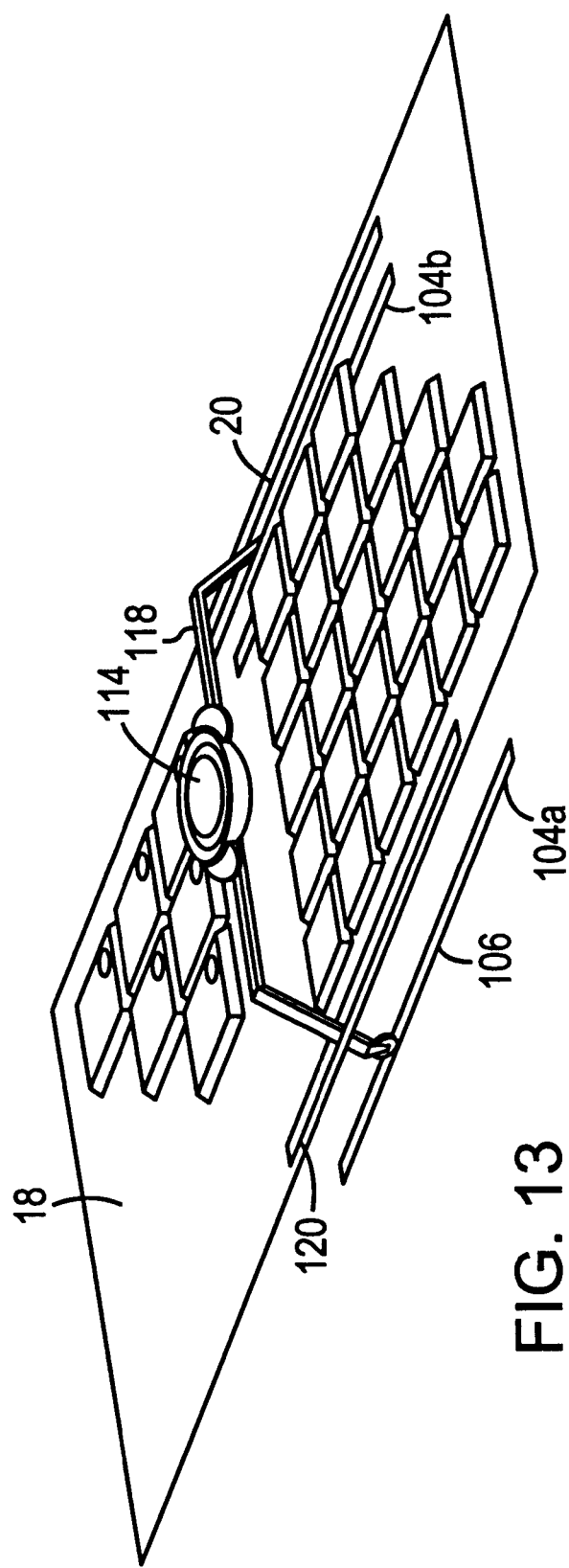
FIG. 13 is a cut away and detailed view of the pointer control mechanism utilized in the present invention.

Referring to FIG. 13, a cut away view of a remote control unit embodying pointer control mechanism 110 constructed in accordance with the principles of the present invention is illustrated. In this view, tracks 23*a* and 23*b* are positioned within slots 120 and extend in the same direction as the slots. Guide bar 118 of pointer control mechanism 110 is coupled at each end to tracks 23*a* and 23*b* to guide the guide bar 118 along the slots 120. Position sensors 106 are distributed throughout the track 23*a* and 23*b*. The position sensors send an electrical signal to the pointer movement processing program 50 (FIG. 9) within the remote control unit to indicate the position of the (y) coordinate associated with the track. This y coordinate is used to position the displayed cursor at a corresponding y position on the display screen. The location of the pointer position guide 114 on guide bar 118 is determined by position sensors within guide bar 118 to indicate an x coordinate for a displayed cursor. The signal from the position sensors are provided to the pointer movement processing program 150 for transmission to computer system 16 controlled by remote control unit 50.

Figure 14A:
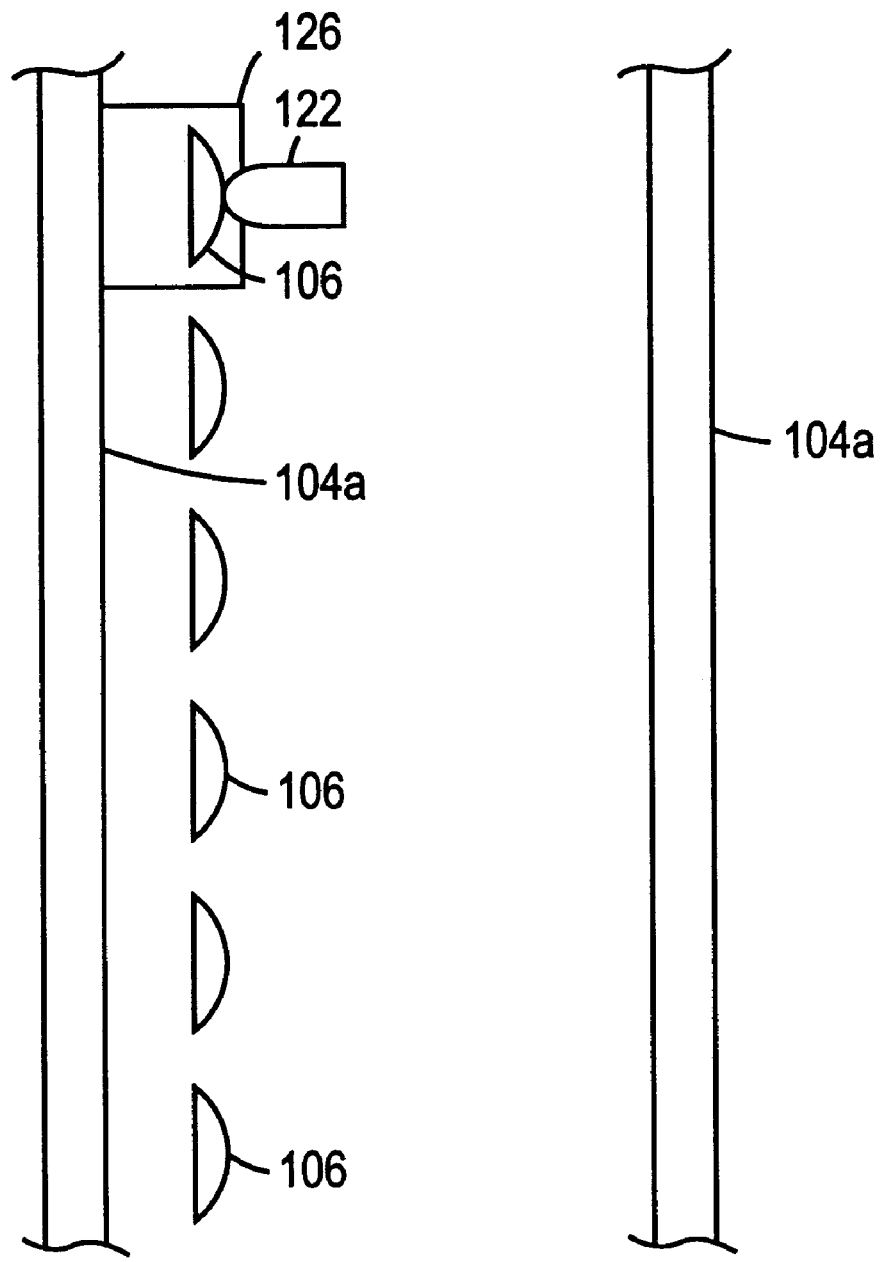
FIG. 14a is top view of position sensors located on a guide track of a pointer control mechanism of a remote control unit.

Referring to FIG. 14*a,* diagrams of an embodiment of position sensors 106 of cursor control mechanism 110 is shown. FIG. 14*a* shows a top view of the tracks in which the position sensors reside. As illustrated in FIG. 14*a,* position sensors 106 are preferably separated by equal distances along tracks 23. The position sensors 106 are electrically coupled via circuitry which transmits a signal to the processing unit when a position sensor 106 is contacted by a contact member 122 of the guide bar 118, thereby completing an electrical circuit and activating the position sensor which is contacted by the contact member 122. The contact member 122 is an extension from the guide bar 18 that extends downward into the tracks 118. The contact member 122 moves along the track when the guide bar 118 is moved and contacts the position sensor that corresponds to the position of the guide bar 118 along the slot 120 or track 104. The position sensors are successively activated as the guide bar is moved along the track 118. The position sensors may move inward toward the track when contacted by the contact member 122 and the position sensors may be electrically conductive to complete an electrical circuit upon contact that sends the activation signal. The pointer movement processing module processes the electrical signal, identifying the activated sensor to a position a pointer on a display screen. Preferably, the (x, y) coordinate pair information generated by the pointer movement processing program is transmitted to home broadcasting unit 36 as an infrared signal.

It should be appreciated that many types of circuits known to those skilled in the art may be used to indicate the position of guide bar 118. For example, referring to FIG. 14*b,* track 104 may provide an electrical resistance $R_1$. One portion of one end 107 of the guide bar 118 may be coupled to a low current source 105 and one end 109 of the track 104 is coupled to the low current source 105. Mounted at each end of a coupling member 111 holding an end of guide bar 118 in track 104 is a electrical contact also coupled to the low current source. Movement of guide bar 118 changes the electrical resistance $R_1$ coupled to the current source and correspondingly the magnitude of the signal generates across the load. The change in resistance or current flow is detected by the computer system through connection 113 to indicate the position with the guide bar along the track 104. The different current flows or resistances are predetermined and are mapped to indicate specific positions of the guide bar 118 alone the track 104. Preferably, the current does not flow through the entire length of the guide bar 118.

Figure 14B:
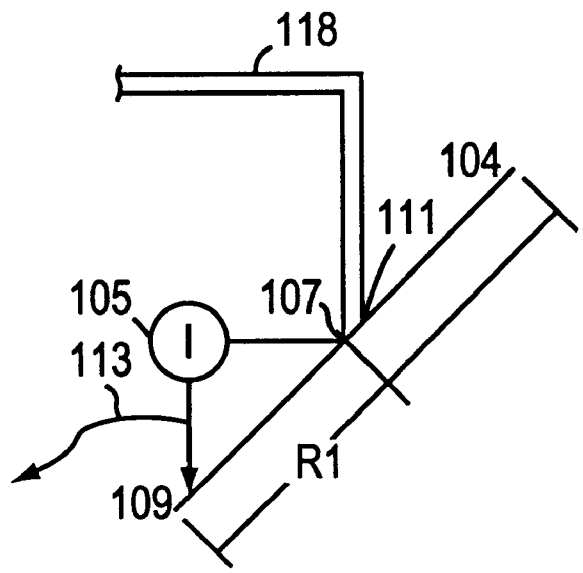
FIGS. 14b and 14c are alternate embodiments of position sensors.
Figure 14C:
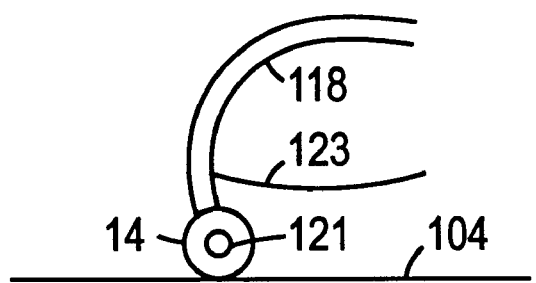

Referring to FIG. 14*c,* another embodiment of a device for generating signals from physical movement to control pointer/cursor movement is illustrated. In this embodiment, the guide bar 118 is coupled to a tracking wheel 121. The tracking wheel 121 is electrically coupled through connection 123 to the processor of the system. As the guide bar 118 is moved along the track 104 the wheel 121 turns and sends an electrical signal to indicate the relative position of the guide bar along the track 1121. The wheel movement tracking circuit may be the general type circuit utilized in tracking the movement of the ball of mouse; however, the movement tracked is a position measurement along a single axis (the track 104). The movement of the guide bar 118 along the track 104 provides a y coordinate for the pointer position.

Figure 15A:
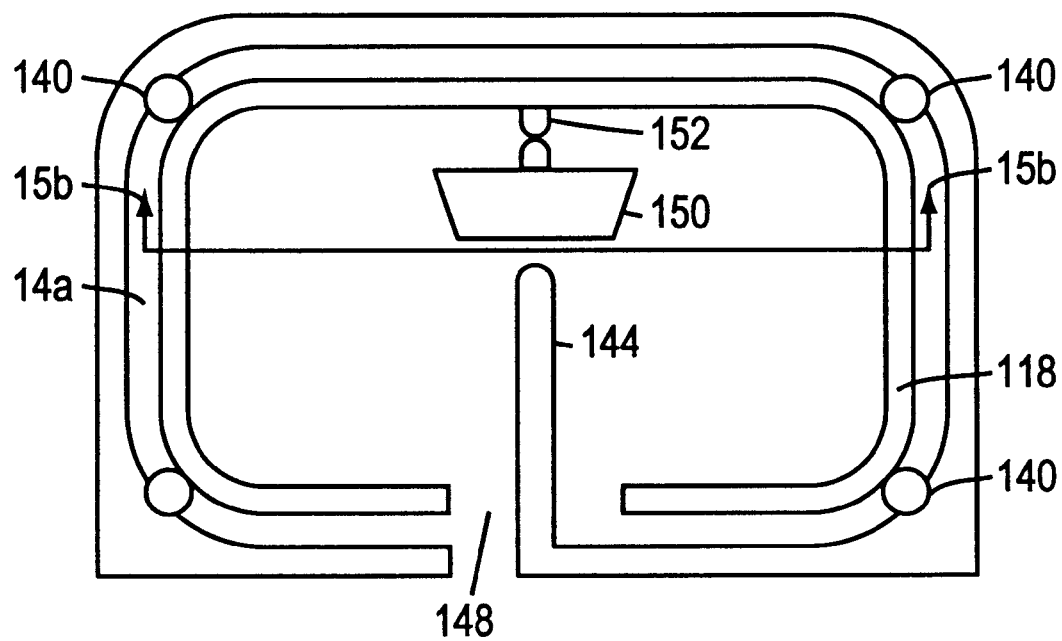
FIG. 15a is a cross sectional view of a position sensing circuit used in a guide bar operating according to the principles of the present invention.
Figure 15B:
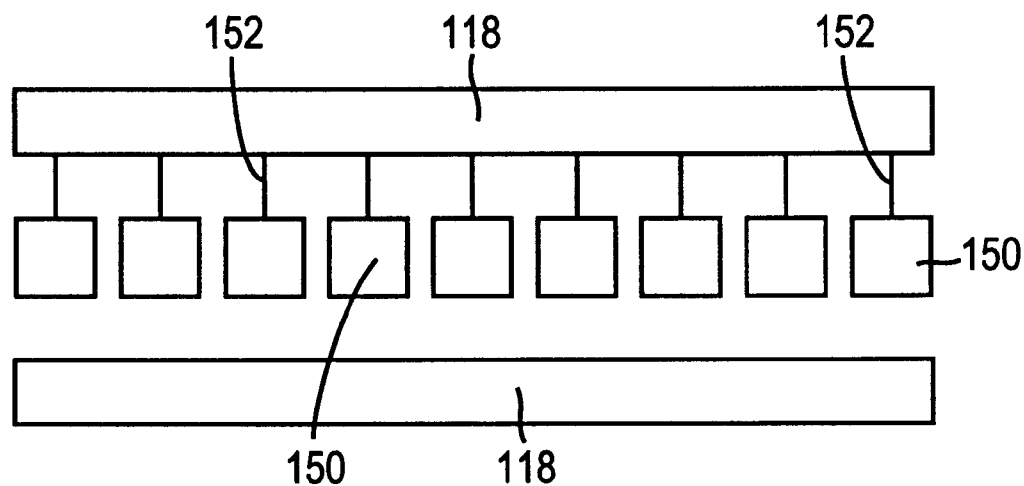

Referring to FIG. 15a, a detailed cross-section view of the pointer position guide 114 as connected along the guide bar 18 is shown. In this view, guide bar position sensors 150 are positioned in the upper portion of the internal cavity of the guide bar member 118 and determine the x direction for pointer movement. The housing of the pointer position guide 114 substantially surrounds the guide bar member 118. The pointer position guide 114 extends through the center of the guide bar 118. Rollers 140 are positioned within the housing of the pointer position guide 114 and are partially enclosed by the housing. The portion of the rollers 140 that are not enclosed within the housing contact the guide bar 118 and facilitate the movement of the pointer position guide 114 along the guide bar 118. The pointer position guide 114 has an extension member 144 that extends into the cavity or opening 148 of the guide bar 118. The extension member 144 is operative to contact the guide bar position sensors 150. The guide bar position sensors 150 operate in the same manner as discussed in connection with the position sensors 106. A circuit 152 is closed when the extension member 144 comes into contact with the guide bar position sensors 150 to activate the guide bar position sensors. When the circuit is closed the electrical signal is transmitted to the processor via a contact point of a row of contact points to indicate the position of the pointer position guide 114 along the guide bar member. This signal is used to control the x position of the pointer on the display screen. The row of guide bar position sensors 150 or contact points are illustrated in FIG. 14b which is a cross sectional view of the guide bar taken along line 15b—15b of FIG. 15a.

Figure 16A:
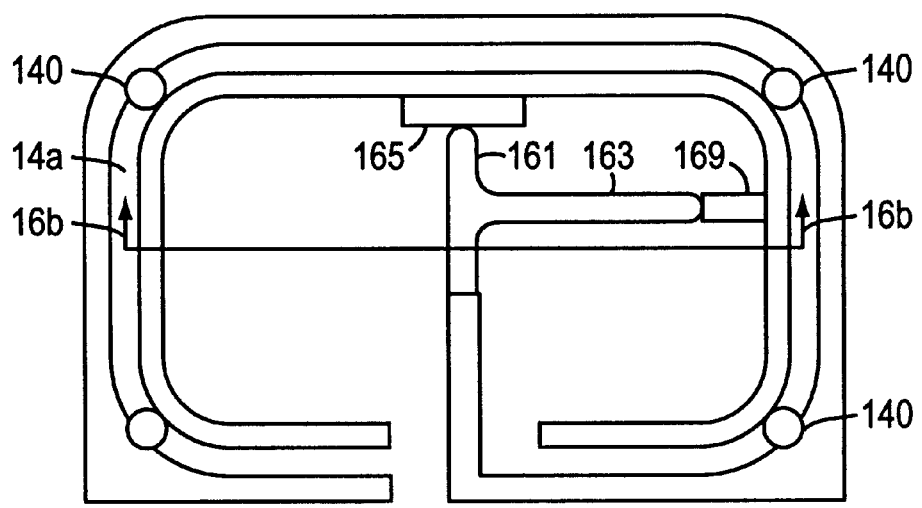
FIG. 16a is a cross sectional view of an alternate embodiment of a position sensing circuit used in a guide bar operating according to the principles of the present invention.
Figure 16B:
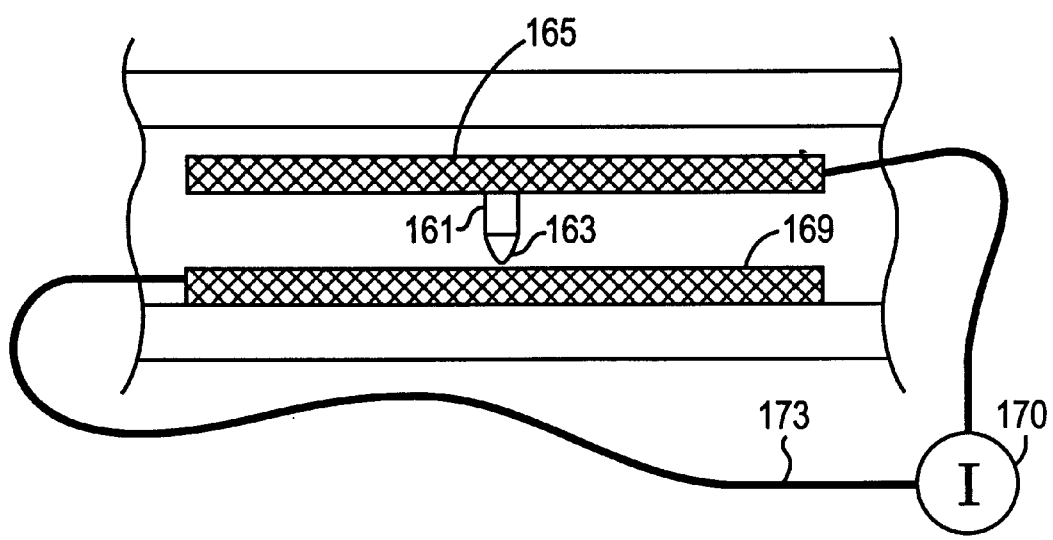

Referring to FIG. 16a, another embodiment of the position sensing circuit for pointer position guide along the guide bar 118 is shown. FIG. 16a shows a detailed cross-section view of the pointer position guide 114 as connected along the guide bar 118 is shown. In this embodiment, the pointer position guide 114 has electrically conductive extension members 161 and 163. Electrical conductors 165 and 169 are positioned within the guide bar and provide electrical resistance. The conductors 165 and 169 are insulated from the guide bar 118. The conductor 165 is a variable resistive layer. One end of the conductor 161 is connected to a current source 170 and one end of the conductor 163 is connected to a current source. The extension members 161 and 163 complete the circuit between the conductors 165 and 169 as the extension members move along the interior of the guide bar 118. As discussed above in connection with FIG. 14b, the current varies in the circuit as the resistance of the completed circuit changes as the extension members 161 and 163 move along the guide bar. Movement of pointer position guide 114 changes the electrical resistance $R_1$ coupled to the current source and correspondingly the magnitude of the signal generates across the load. The change in resistance or current flow is detected by the computer system through connection 173 to indicate the position with the pointer position guide along the guide bar 118. The different current flows or resistances may be predetermined and may be mapped to indicate specific positions of the pointer position guide 114 alone the guide bar 118. FIG. 16b which is a cross sectional view of the guide bar taken along line 16b—16b of FIG. 16a. It should be appreciated by those skilled in the art that many types and combinations of position sensors may be used in connection with the present invention to determine the x and y coordinates of a pointer position guide which is used to generate coordinate positions for controlling a pointer or cursor.

Figure 17A:
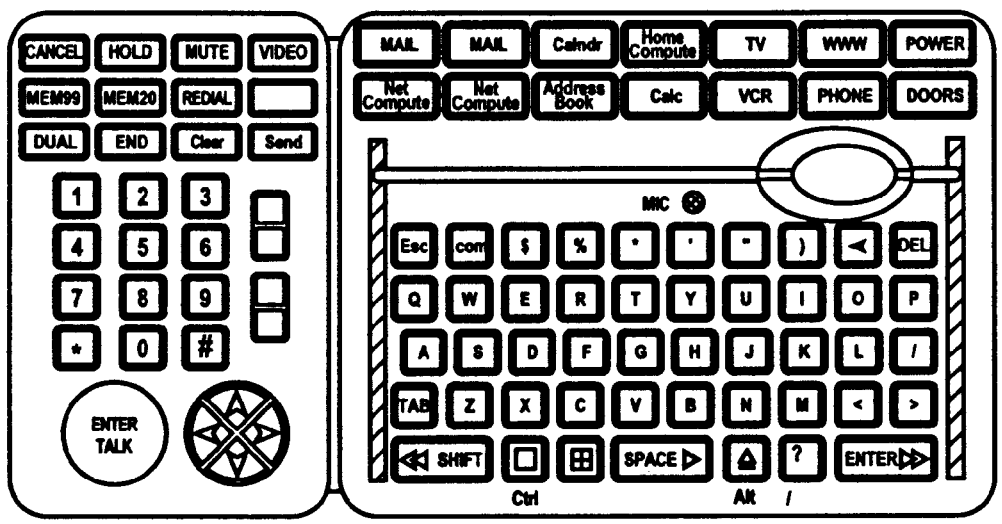
FIGS. 17a, 17b, and 17c illustrate various embodiments that utilize the pointer control mechanism of the present invention.
Figure 17B:
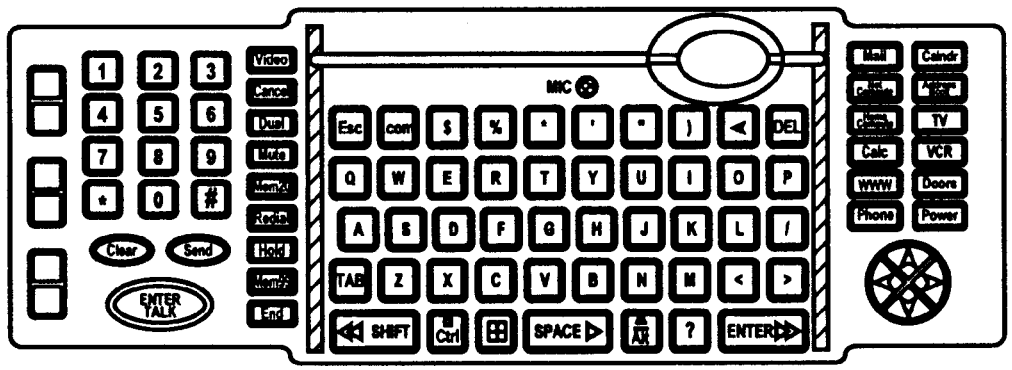
Figure 17C:
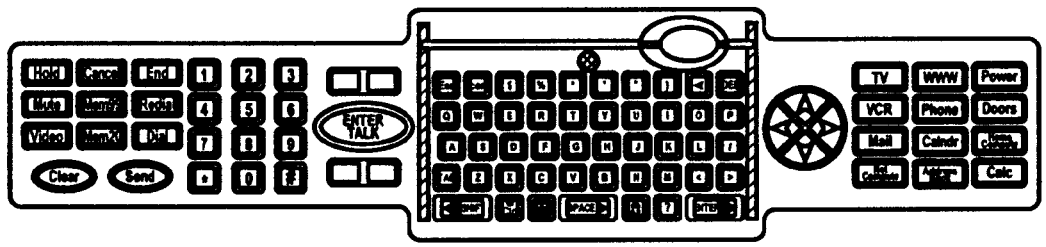

Referring to FIGS. 17a, 17b and 17c various embodiments of a remote control unit or keyboard are illustrated. Each of the embodiments has keys of the keypads positioned in different places on the board. Although the pointer control mechanism 110 is shown illustrated over the computer type alpha keypad, the pointer control mechanism 110 can be positioned over any portion of the keyboard as selected by a designer of the keypad. It should be appreciated by those skilled in the art that the pointer control mechanism 110 may be positioned on a standard type computer keyboard used for inputting data to a computer system and may be designed to be used on a keyboard for a portable computer.

Figure 18:
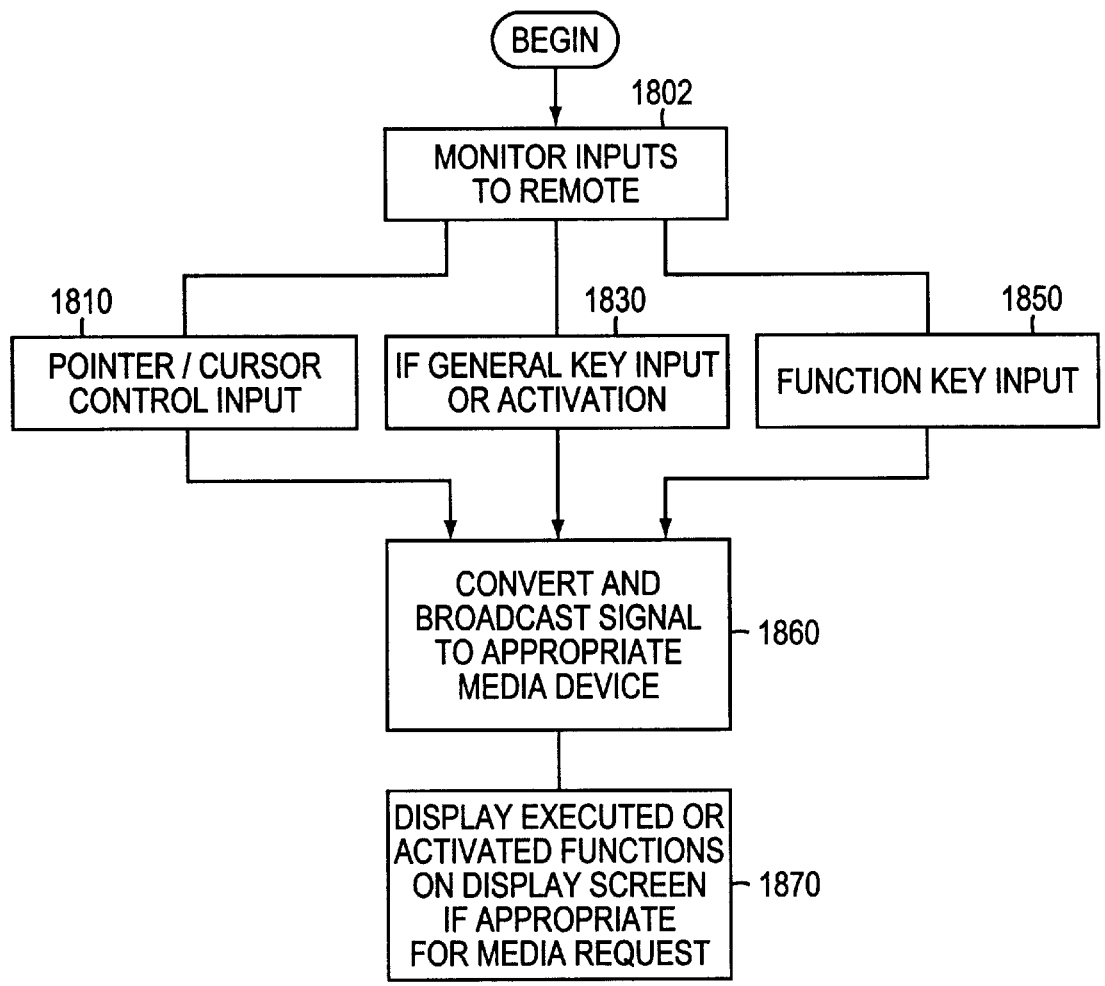
FIGS. 18, 19, 20, 21 and 22 illustrate processes implemented according to the present invention.

Referring to FIG. 18, the processes implemented in connection with the remote control unit 50 operating according to the principles of the present invention are described. At step 1802, the inputs from keys and the pointer control mechanism of the present invention is described. From step 1802, the process proceeds to step 1810, 1830, or 1850. If the user moves the pointer control mechanism the process proceeds to step 1710. The processes implemented at step 1710 are discussed in connection with FIG. 19. If the user inputs a general operation key, such as from keys 116, the process proceeds to step 1830. At step 1830, the signal is processed at the remote control 50 and is transmitted to the computer system. If the user selects one of the function keys 24, the process proceeds to step 1850 where the appropriate control is implemented. The processes implemented when the function keys are selected are described in FIG. 18. The input signals are broadcast to the appropriate media device at step 1860. At step 1870, the activated functions are displayed on the selected television if appropriate for the media request.

Figure 19:
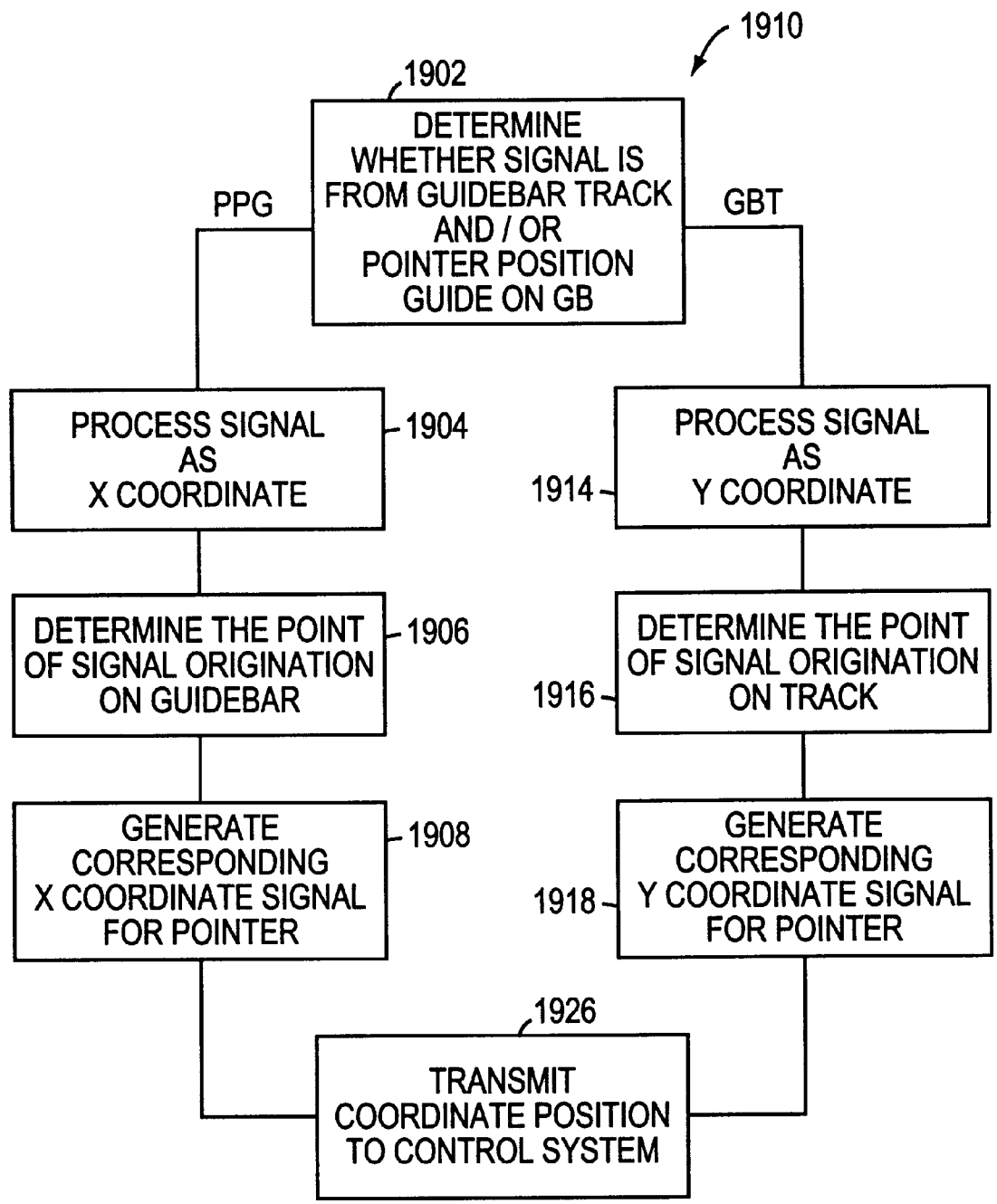

Referring to FIG. 19, the processes implemented when the pointer control mechanism 110 is moved are discussed. At step 1902, the process determines whether the signal generated from the pointer control mechanism 110 originates from the guide bar track 104 or the pointer position guide on the guide bar 118. If the signal originated from the pointer position guide 114 on the guide bar track 104, the signal is processed as an x coordinate at step 1904. At step 1906, the point of signal origination along the guide bar 118 is determined. The process then proceeds to step 1908, where the x coordinate corresponding to the location on the guide bar 118 from which the signal originated is generated. If the guide bar is moved along the tracks 104, the process proceeds to step 1914 where the signal is processed as an x coordinate. At step 1916, the point of signal origination along the track 104 is determined. The process then proceeds to step 1908, where the y coordinate corresponding to the location on the track 104 from which the signal originated is generated. The appropriate x and/or y coordinate is transmitted to the computer system 16.

Figure 20:
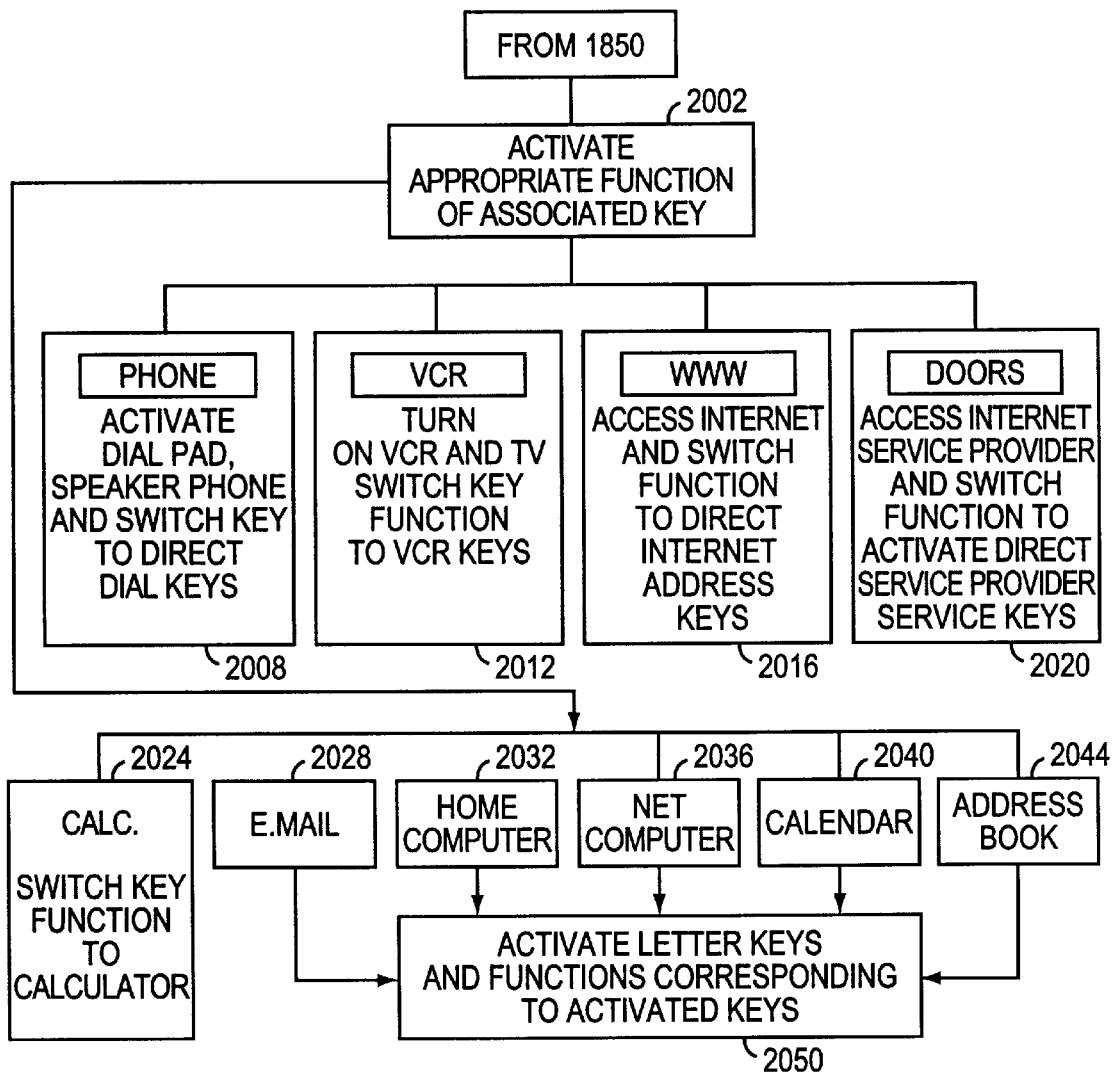

Referring to FIG. 20, the processes implemented as discussed above in association with the function keys of the remote control 50 are discussed. At step 2002, the appropriate computer program module that corresponds to the activated function is implemented. At step 1908, the functions associated with the phone button 124h are activated. The keypad 142 is activated to dial dual tone multi-frequency (DTMF) signals. The speaker phone and microphone functions of the remote control 50 are implemented and the keypad 116 is switched to direct dial functions. At step 2012, the functions implemented when the VCR button 124g is pressed are enabled. The VCR is turned on and the television is turned on if the television is off, and selected functions of the keypad 116 are switched to operate as VCR controls. At step 2016, the functions implemented when the "www" button is selected are implemented. At this step, an Internet program is activated in the computer system and the keypad 116 switches its functions to become direct Internet address access keys. At step 2020, the functions implemented when the "doors" functions is activated are enabled. At this step, an Internet service provider is accessed and the functions of keypad 116 are switched to directly access services provided by the Internet access provider. At step 2024, the functions associated with the calculator function are implemented. At this step, the keypad 142 is switched to generate numbers or number symbols to be used in connection with a calculator. Steps 2024, 2028, 2032, 2036, 2040, and 2044 perform the functions associated with the calculator function, e-mail function 124a, home computer function 124c, net computer function 124d, calendar function 124b, and address book function 124e as discussed above. At step 2050, the letter keys and functions associated with the activated keys are activated.

Figure 21:
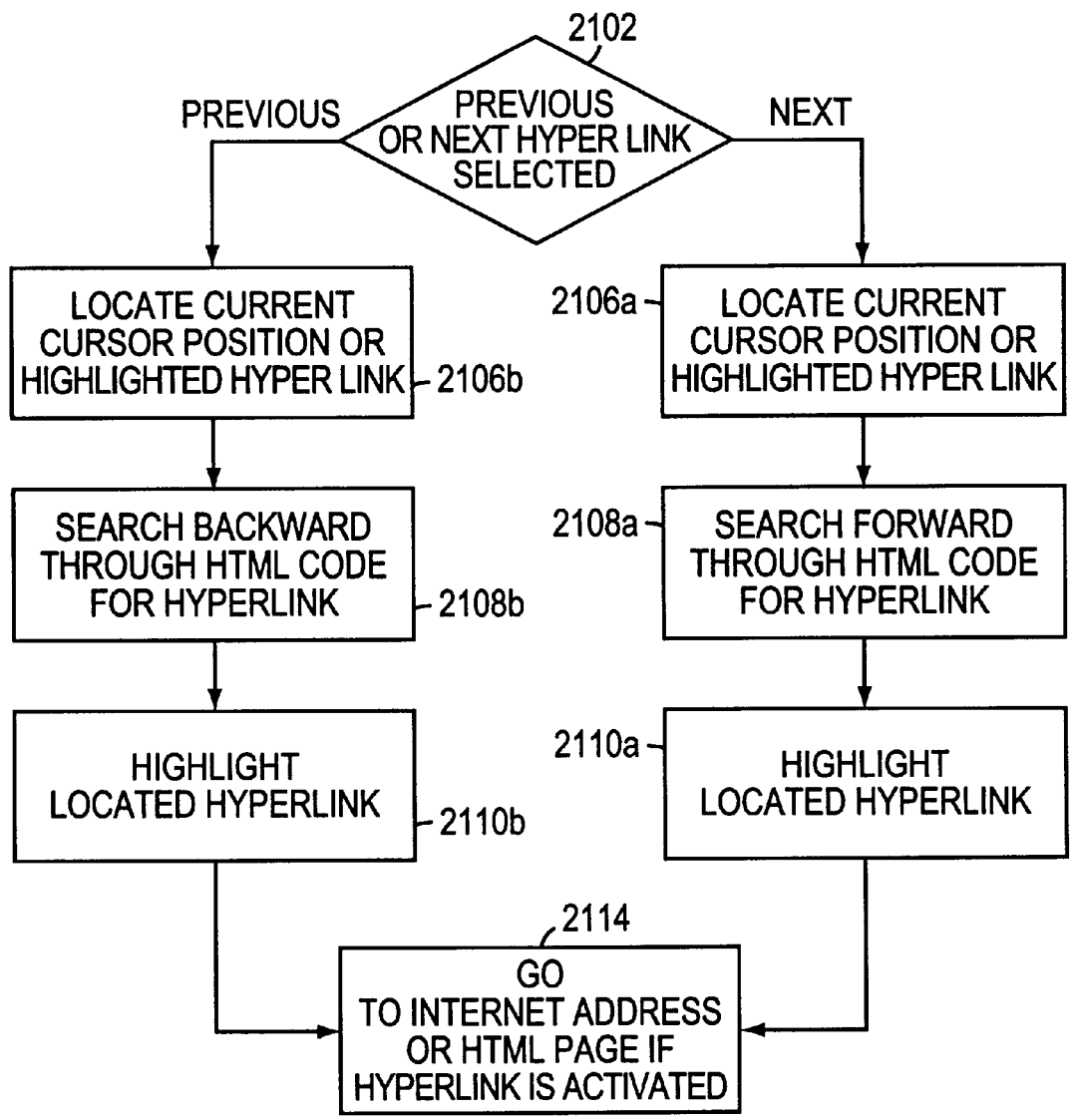

Referring to FIG. 21, the processes associated with the hyperlink controls 138 and 139 are illustrated. The computer system determines at Step 2102 whether a user selected the forward search hyperlink control 138 (next) or the backward search hyperlink control 139 (previous) and executes the processes associated with the selected command. When the user selects the forward search hyperlink control 138, the process proceeds to Step 2106a. The computer system locates the current cursor position to begin the search or locates a currently highlighted hyperlink. If a hyperlink search control is selected prior to the user establishing a cursor position within the internet address or HTML page, the first hyperlink location may be utilized as the starting point for the selected search command. At Step 2108a, the process searches forward in the direction of text or graphics flow on the page to locate HTML code that identifies the hyperlink in the forward search direction. When the first occurrence of the hyperlink is located in the forward search position, the text or graphics associated with the hyperlink location is highlighted at Step 2110a. The user has the option of activating the highlighted hyperlink by pressing an enter control of the computer system or by activating a selection control mechanism of a cursor control mechanism. When a user activates a highlighted hyperlink, the internet address or HTML page associated with the hyperlink is accessed as indicated at Step 2114.

If, at Step 2102, the user selected the backward search hyperlink control 139, the process proceeds along the branch label "previous". At Step 2106b, the process locates the current cursor position or currently highlighted hyperlink. If the user has not established a cursor position or if a hyperlink has not been highlighted, the first hyperlink within the page may be used as a starting point for the search. At Step 2108b, the computer program search module searches backwards through the HTML code of the displayed page for the first occurrence of the hyperlink in the backward search direction. When the hyperlink is located, the hyperlink is highlighted as indicated at Step 2110b. If the user activates the highlighted hyperlink, the process proceeds to Step 2114 where the internet address or HTML page is accessed.

Figure 22:
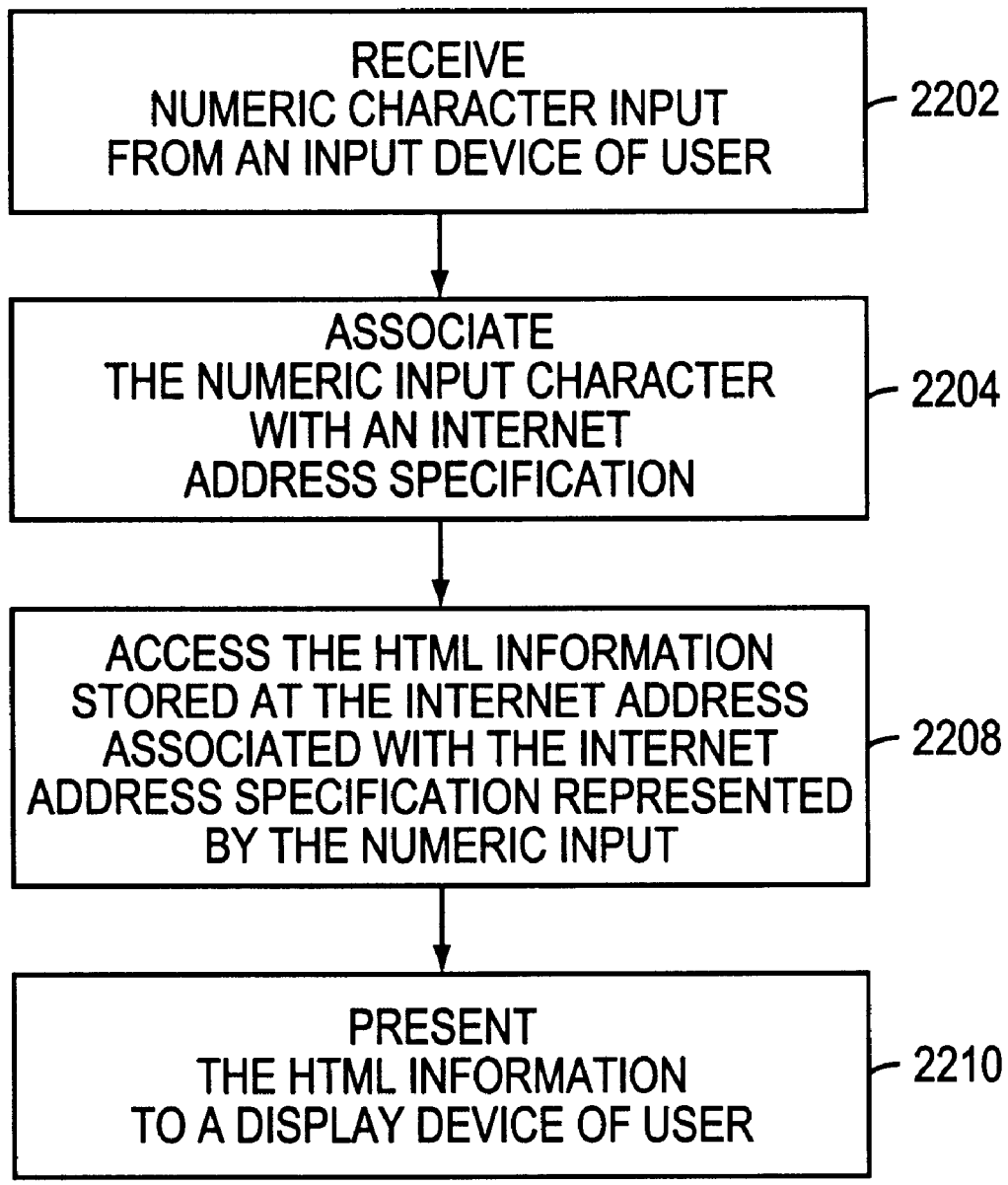

Referring to FIG. 22, a flow diagram of the processes implemented when a user inputs a numeric or letter character into an input device, such as a keyboard, remote control or computer system, of the user. At Step 2202, a processing unit receives a numeric or letter character (character) input from a user. At Step 2204, the numeric input is associated with a predefined internet address such as "user/company@domainname". As discussed above, the numeric input may be associated with the internet address at the input device of the user or the numeric input may be transmitted to a computer system of an internet service provider's computer system which then associates the character with the internet address. In response to the numeric or letter input being associated with the internet address, the HTML data stored at the internet address is accessed at step 2208 and is presented to the user at Step 2210.

The descriptions given herein are provided as examples and are not intended to limit the principles or scope of the present invention. Those skilled in the art will readily appreciate from a review of descriptions herein that many modifications, changes or extension may be made from the specific embodiments described herein without departing from the scope of the invention defined by the following claims.

What is claimed is:

1. A control device for controlling the movement of a pointer on a display screen, the control device comprising:
   a housing;
   at least one key coupled to the housing, and operable to generate a signal to control the display on the display screen;
   a movable guide bar extending over said housing, said movable guide bar being movable over said key in a first direction to generate a first directional control signal; and
   a pointer control mechanism selectively movable along said movable guide bar in a second direction to generate a second directional control signal, said first and second directional signals being generated to control a pointer displayed on the display screen.

2. The device of claim 1 wherein said keys can be operated to input information to a processing unit mounted on said housing.

3. The device of claim 2 wherein said housing unit comprises a remote control unit.

4. The device of claim 3 wherein said keys include a set of function keys operable to select one of a plurality of modes of operation of a computer system.

5. The device of claim 4 wherein said function keys are operable to select a television mode and network communication mode.

6. The device of claim 4 wherein said keys comprise a typewriter keypad.

7. The device of claim 1 wherein said key comprises at least a portion of a computer keyboard structure.

8. The device of claim 1 wherein the housing defines slots, said slots receiving said movable guide member and defining areas that establish the boundaries of movement of said guide member.

9. The device of claim 8 wherein said boundaries are in a vertical direction on said housing.

10. The device of claim 9 further comprising guide tracks positioned along said slots, said guide having ends coupled to said tracks.

11. The device of claim 10 wherein the movement of said pointer control mechanism along said movable guide bar defines movement of said pointer in the first direction in Cartesian coordinates and wherein movement of said movable guide bar along said slots defines movement of said pointer in the second direction in Cartesian coordinates.

12. The device of claim 11 wherein said first direction is the x direction and said second direction is the y direction in Cartesian coordinates.

13. The device of claim 1 wherein said pointer control mechanism has a control selection mechanism positioned thereon, said control selection mechanism for activating a control item of a computer program executing on a computer system.

14. The device of claim 1 wherein the housing is configured with a handgrip to permit a person to grasp and support the control device.

* * * * *